(12) United States Patent
Ellsworth et al.

(10) Patent No.: US 6,378,885 B1
(45) Date of Patent: Apr. 30, 2002

(54) BICYCLE SUSPENSION APPARATUS AND RELATED METHOD

(75) Inventors: Anthony S. Ellsworth, 23672 San Vicente Rd., Suite 200, Ramona, CA (US) 92065; Mike Kojima, Cypress, CA (US)

(73) Assignee: Anthony S. Ellsworth, Ramona, CA (US)

( * ) Notice: Subject to any disclaimer, the term of this patent is extended or adjusted under 35 U.S.C. 154(b) by 0 days.

(21) Appl. No.: 09/623,210
(22) PCT Filed: Mar. 2, 1999
(86) PCT No.: PCT/US99/04853
§ 371 Date: Aug. 29, 2000
§ 102(e) Date: Aug. 29, 2000
(87) PCT Pub. No.: WO99/44880
PCT Pub. Date: Sep. 10, 1999

Related U.S. Application Data
(60) Provisional application No. 60/076,489, filed on Mar. 2, 1998.

(51) Int. Cl.$^7$ ............................................... B62K 25/30
(52) U.S. Cl. ..................................................... 280/284
(58) Field of Search ............................. 280/285, 281.1, 280/283, 284, 286, 288

(56) References Cited

U.S. PATENT DOCUMENTS 494,803 A 4/1893 Cable (List continued on next page.)

FOREIGN PATENT DOCUMENTS

FR 2 774 966 * 8/2000

OTHER PUBLICATIONS

A one page brochure from a bike shop advertising a VPP Outland frame. The advertisement appeared at p. 7 in a Summer 1998 catalog. Applicants are unaware of any author for the brochure, Jun. 1998.
One page entitled "A Werewolf in Santa Ana" appearing in the Aug., 1997 issue of Mountain Bike. No author is indicated, Aug. 1998.

Primary Examiner—Robert P. Olszewski
Assistant Examiner—Andrew J. Fischer
(74) Attorney, Agent, or Firm—Stout, Uxa, Buyan & Mullins, LLP.; Greg S. Hollrigel

(57) ABSTRACT

A shock absorbing wheel suspension apparatus includes an upper rocker arm (6) and a lower roker arm (8) pivotally attached to a bicycle frame (3) with rear shock stays (9) pivotally attached to one end of the upper and lower rocker arms. A shock absorbing element (J) is connected to the opposite ends of the upper and lower rocker arms. This arrangement increases performance by aligning forces for various loading conditions.

16 Claims, 21 Drawing Sheets

U.S. PATENT DOCUMENTS

| | | | |
|---|---|---|---|
| 603,418 A | 5/1898 | Adriance | |
| 625,456 A | 5/1899 | Mills et al. | |
| 3,917,313 A * | 11/1975 | Smith et al. | 280/284 |
| 3,974,892 A | 8/1976 | Bolger | |
| 4,058,181 A | 11/1977 | Buell | |
| 4,789,174 A | 12/1988 | Lawwill | |
| 5,121,937 A | 6/1992 | Lawwill | |
| 5,217,241 A | 6/1993 | Girvin | |
| 5,244,224 A | 9/1993 | Busby | |
| 5,306,036 A | 4/1994 | Busby | |
| 5,354,085 A | 10/1994 | Gally | |
| 5,409,249 A | 4/1995 | Busby | |
| 5,441,292 A | 8/1995 | Busby | |
| 5,474,318 A | 12/1995 | Castellano | |
| 5,509,679 A | 4/1996 | Leitner | |
| 5,553,881 A | 9/1996 | Klassen et al. | |
| 5,628,524 A | 5/1997 | Klassen et al. | |
| 5,671,936 A | 9/1997 | Turner | |
| 5,678,837 A | 10/1997 | Leitner | |
| 5,957,473 A * | 9/1999 | Lawwill | 280/284 |
| 6,056,307 A * | 5/2000 | Busby | 280/284 |
| 6,102,421 A * | 8/2000 | Lawwill | 280/284 |
| 6,161,858 A * | 12/2000 | Tseng | 280/281.1 |
| 6,199,886 B1 * | 3/2001 | Guenther | 280/284 |

* cited by examiner

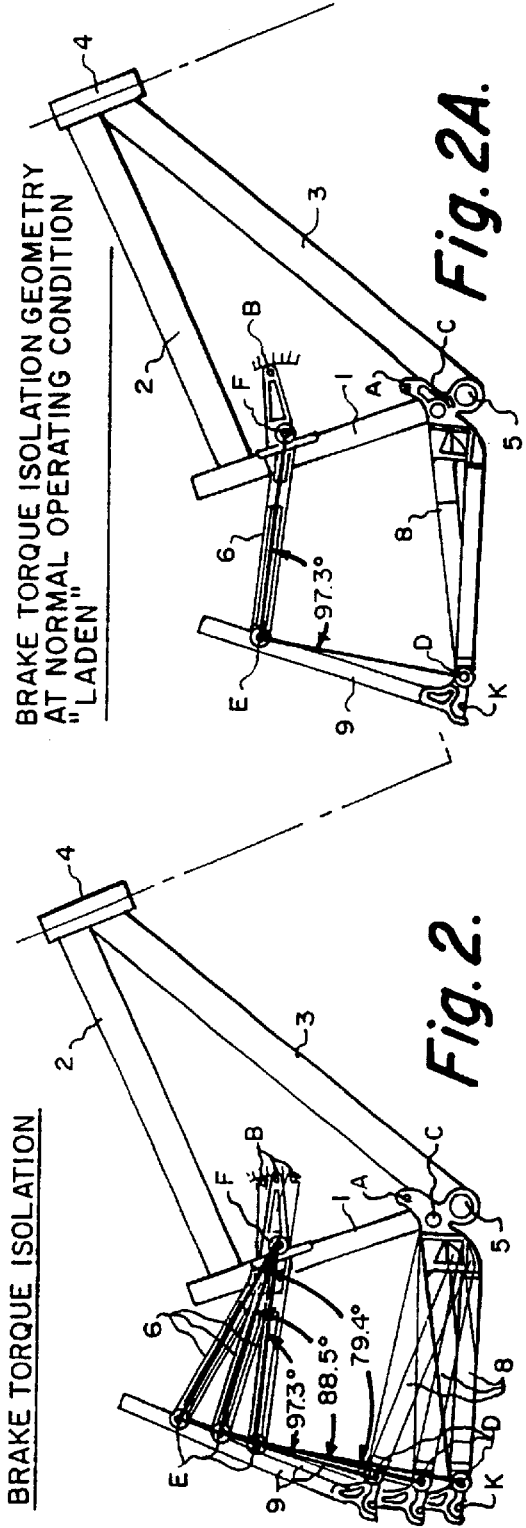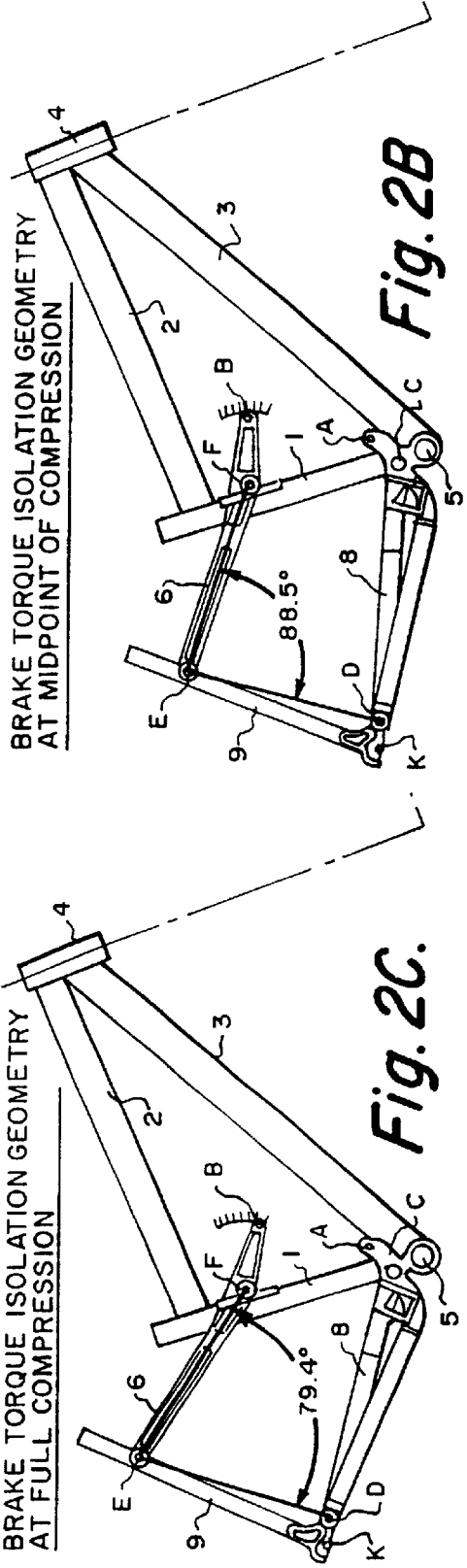

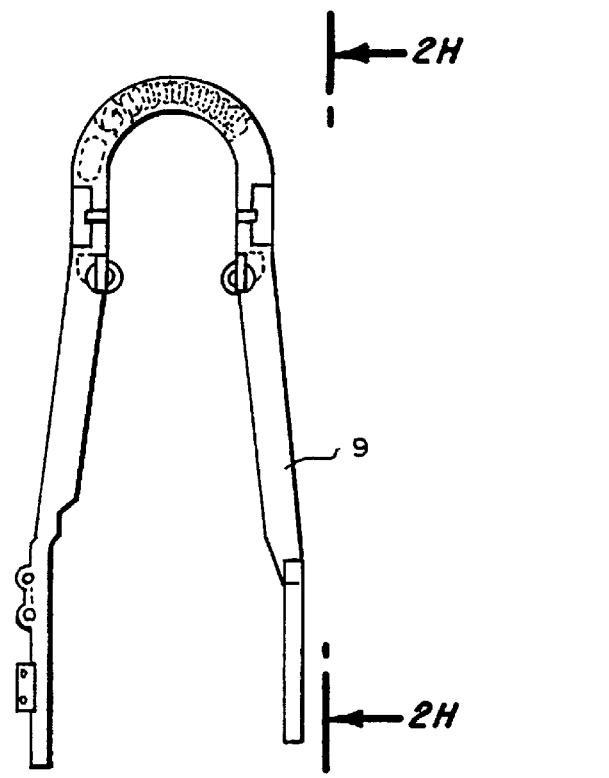
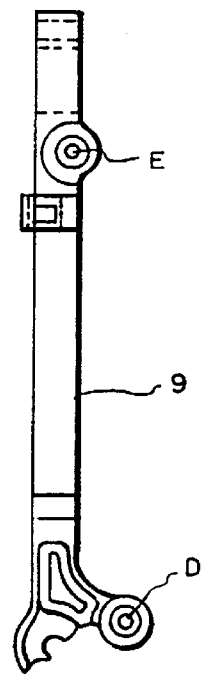
*Fig.2G*  *Fig.2H.*
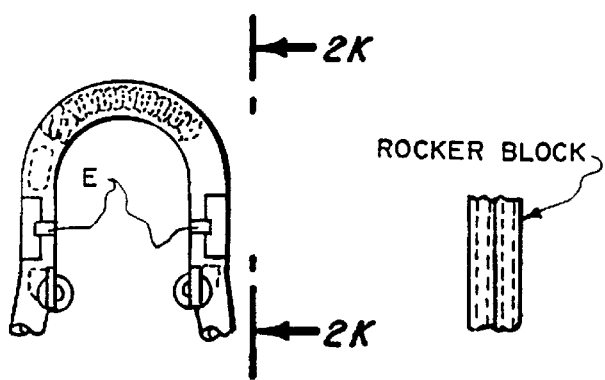
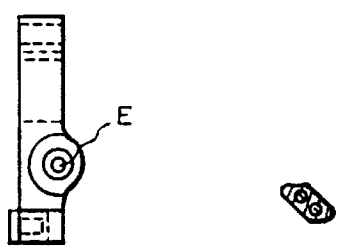
*Fig.2I*  *Fig.2J*  *Fig.2K*  *Fig.2L*

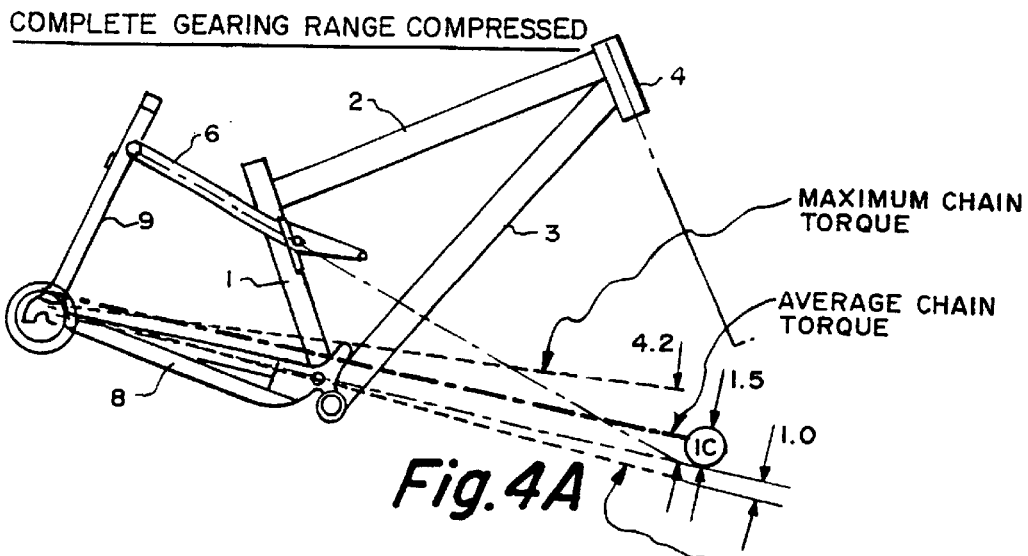
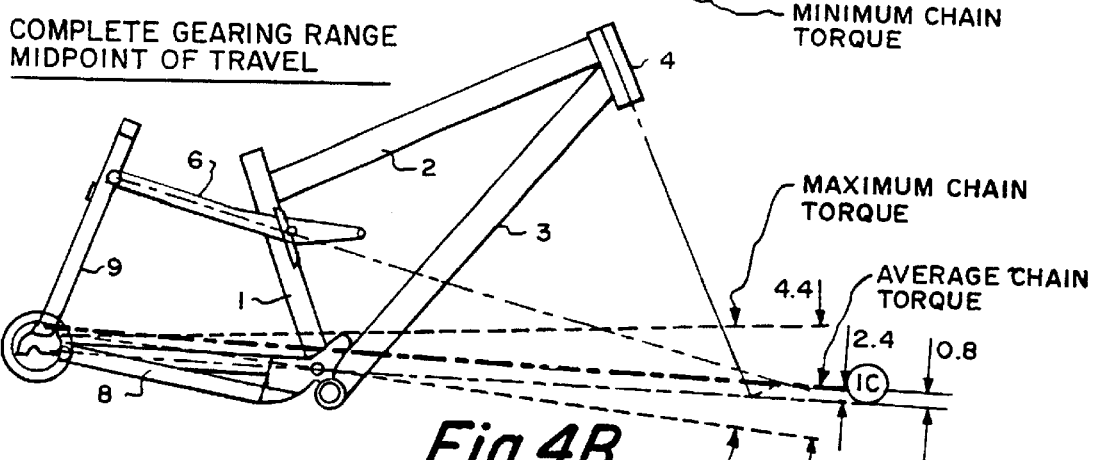
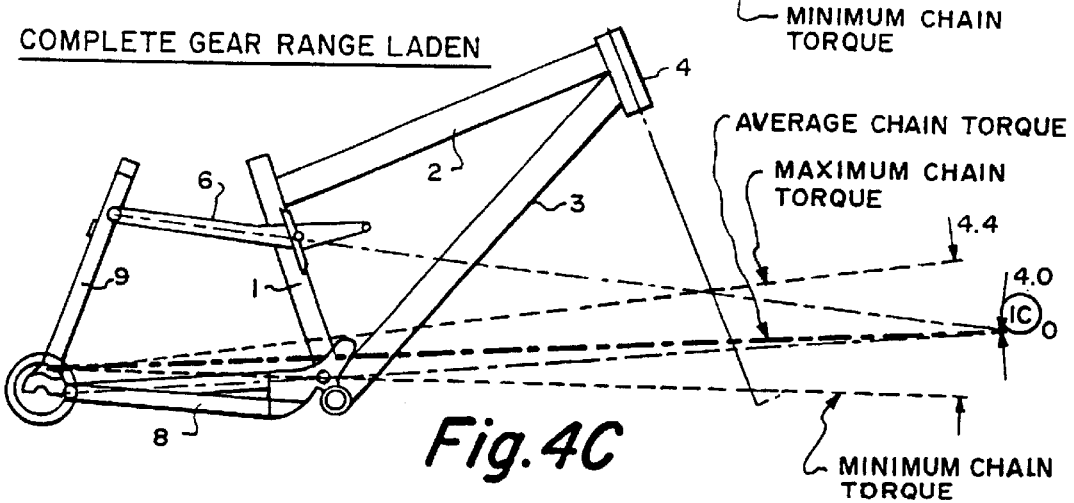

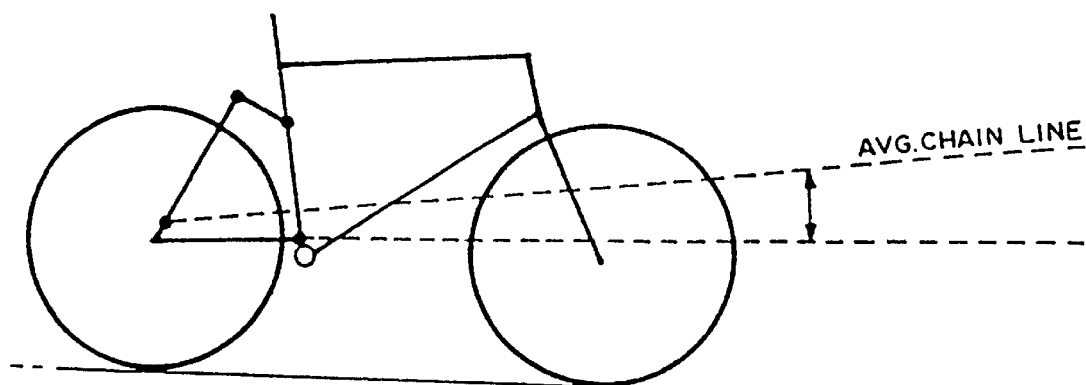
Fig. 7. -Prior Art-
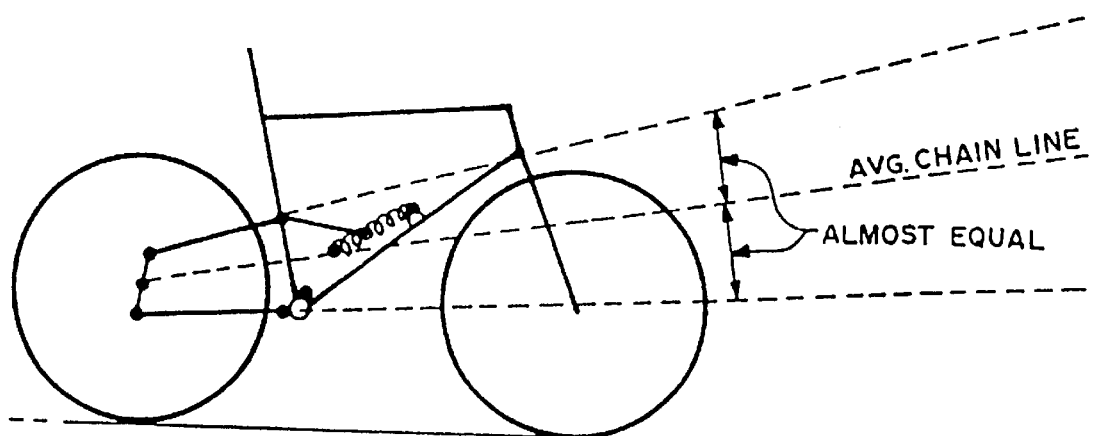
Fig. 8. -Prior Art-
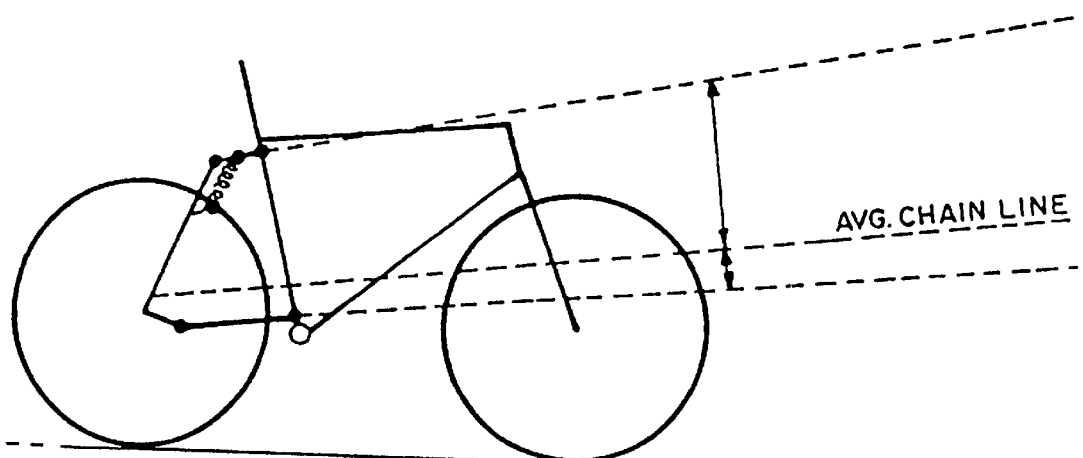
Fig. 9. -Prior Art-

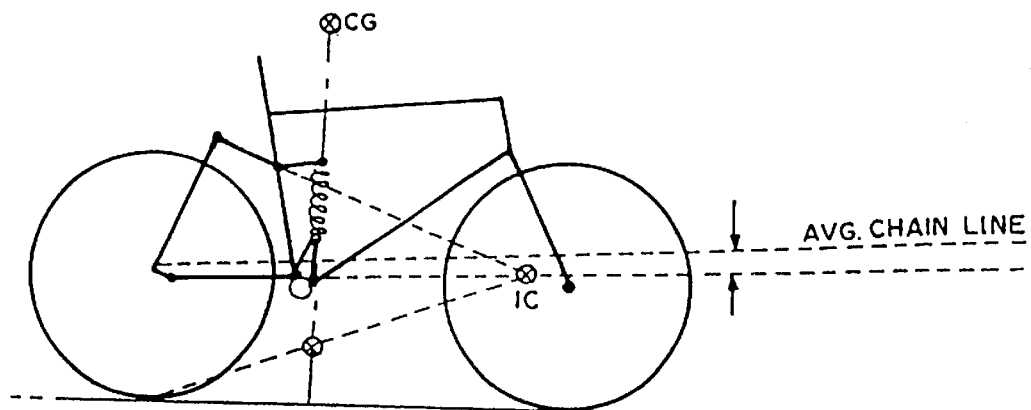
Fig. 10. -Prior Art-
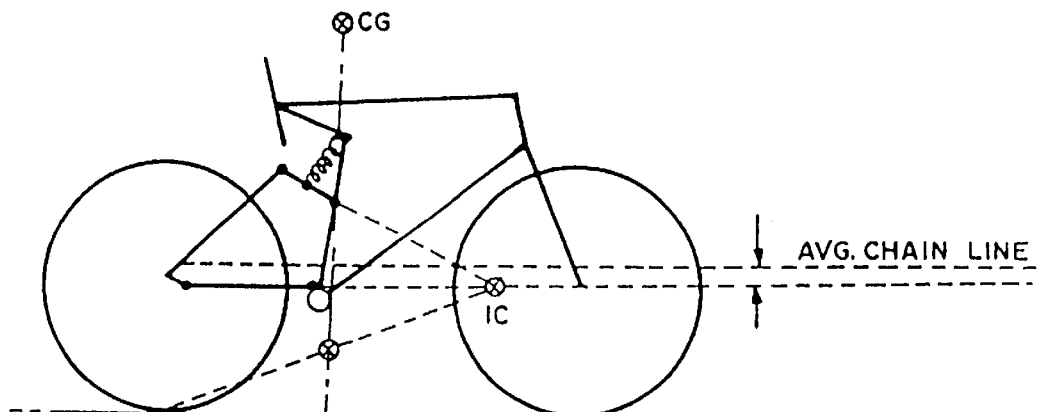
Fig. 11. -Prior Art-
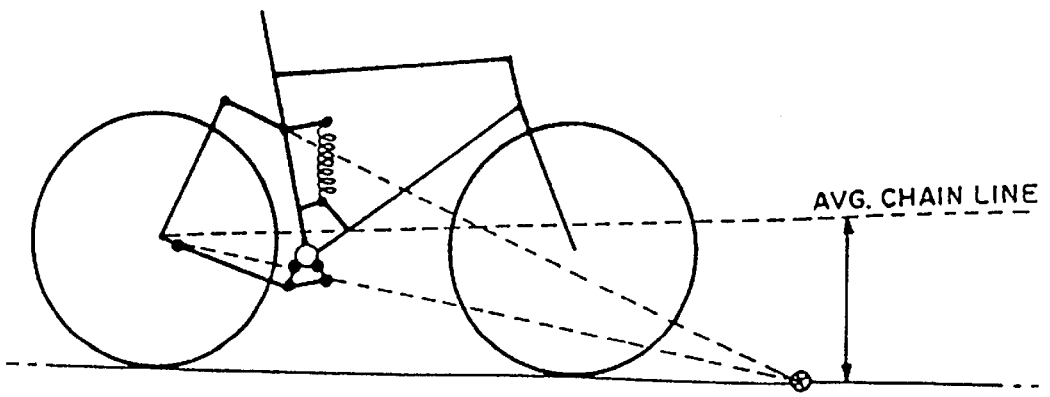
Fig. 12. -Prior Art-

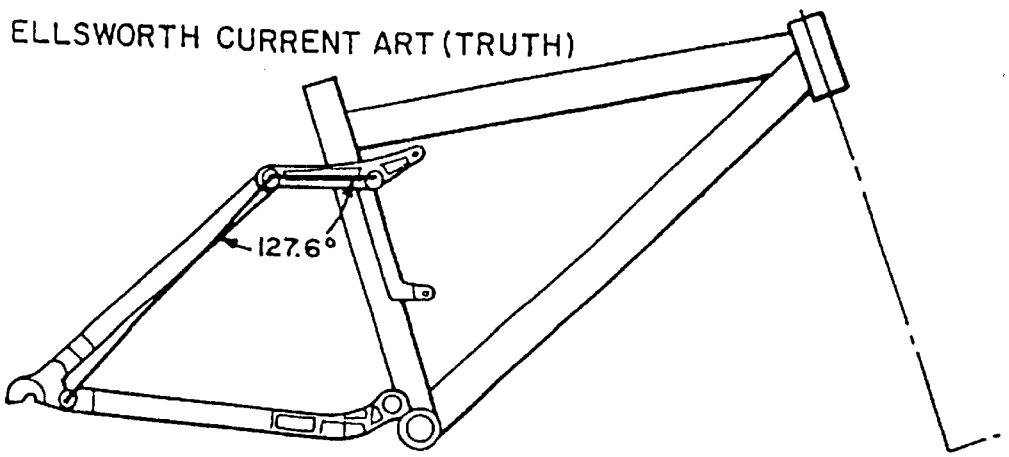
Fig. 13A -Prior Art-
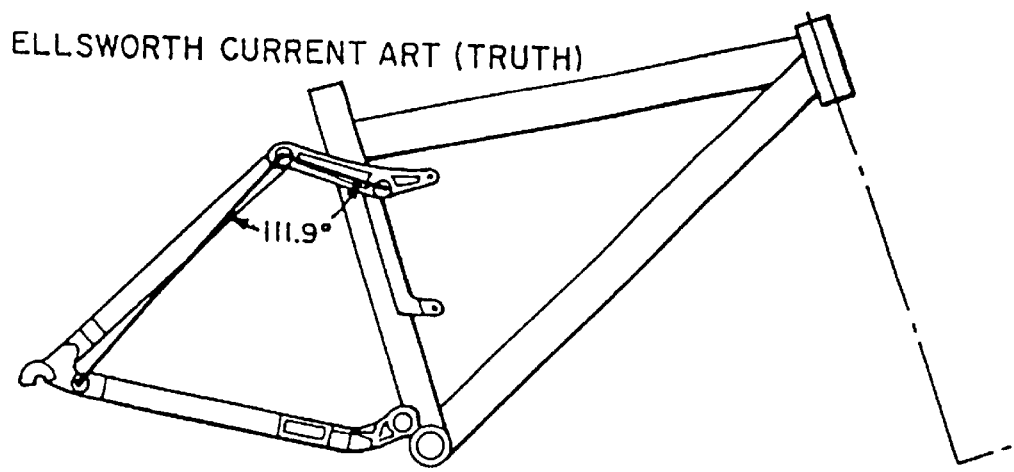
Fig. 13B -Prior Art-
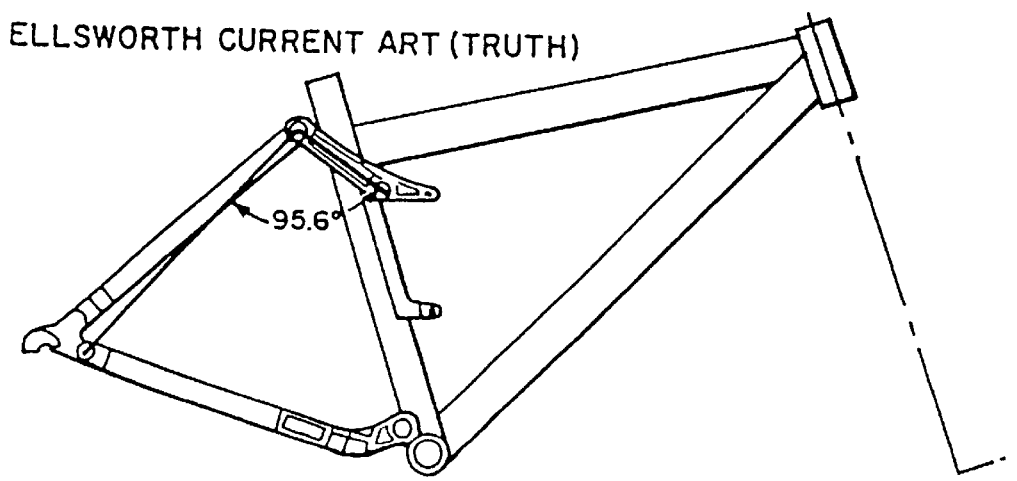
Fig. 13C -Prior Art-

| % Compression | IC-CT | | | | | | | |
|---|---|---|---|---|---|---|---|---|
| | 5,509,679 Fig. 3 | pecialized FSR | Turner A.B. | Intense M-1 | ruth 2000 | Dare | GT Lobo | GT LTS |
| 0 | -3.77 | 0.71 | -0.66 | 2.2 | -0.36 | -1.2 | -10.6 | -35.25 |
| 100 | -0.27 | 2.01 | 1.46 | 2.6 | 1.2 | 1.46 | -5.00 | 3.00 |

| % Compression | IC-CT/ICd | | | | | | | |
|---|---|---|---|---|---|---|---|---|
| | 5,509,679 Fig. 3 | pecialized FSR | Turner A.B. | Intense M-1 | ruth 200 | Dare | GT Lobo | GT LTS |
| 0 | -0.09 | 0.02 | -0.02 | 0.08 | -0.01 | -0.02 | -0.12 | -0.10 |
| 100 | -0.01 | 0.11 | 0.08 | 0.14 | 0.05 | 0.04 | -0.09 | 0.07 |

BICYCLE SUSPENSION APPARATUS AND RELATED METHOD

This application claims the benefit of U.S. U.S. Provisional Patent Application No. 60/076,489, filed Mar. 2, 1998.

The invention is directed to a shock absorbing wheel suspension apparatus and related method. Although the preferred embodiment is described with respect to the rear suspension on a mountain bike, persons of ordinary skill in the art will understand that the invention may be readily utilized in other configurations and devices, especially those using chain drive power on a suspended wheel, including (by way of example and not by way of limitation) suspensions for motorcycles, tricycles, four-wheeled vehicles, and other vehicles.

BACKGROUND OF THE INVENTION

The following table sets forth U.S. patents which may be material to the patentability of the invention:

| U.S. Pat. No. | Inventor | Issued |
| --- | --- | --- |
| 4,789,174 | Lawwill | 12/88 |
| 5,121,937 | Lawwill | 6/92 |
| 5,217,241 | Girvin | 6/93 |
| 5,244,224 | Busby | 9/93 |
| 5,306,036 | Busby | 4/94 |
| 5,409,249 | Busby | 4/95 |
| 5,441,292 | Busby | 8/95 |
| 5,474,318 | Castellano | 12/95 |
| 5,509,679 | Leitner | 4/96 |
| 5,628,524 | Klassen et al. | 5/97 |
| 5,671,936 | Turner | 9/97 |
| 5,678,837 | Leitner | 10/97 |

Also, a number of Internet websites currently display bicycles having wheel suspension. Examples can be seen at the websites for the following companies: Cyber Cyclery, Intense Cycles, Inc., GT Bicycles, Mountain Cycle, Schwinn, and Ventana Mountain Bikes.

Although current bicycle suspension designs typically include shock absorption capabilities that are intended, among other things, to provide comfort and safety and, ideally, to allow the tires to maintain contact with the ground (even on uneven surfaces) and have traction on rough, steep climbs and descents, current designs have a number of inherit faults or shortcomings.

Among other things, suspensions typically permit riders to descend with greater speed, control and comfort. Moreover, although the suspension provides some benefits for climbing (and, as indicated, definitely provides important benefits to descending), many (if not most) current designs are actually generally considered a hindrance to climbing. During climbing, most prior art suspensions "suck" power (as described below); the less kinetically efficient designs typically "suck" the most power during climbing. In addition, many prior art suspension designs are so bulky or contorted that they add undesirable weight to the bicycle, which also "sucks" power from the rider, especially during climbing.

While some of the benefits provided by the invention might be achievable by using idler pulleys and other components, such approaches presumably would add weight (for the extra components) and the additional drag of pulleys would of course require additional energy to propel (from the rider, the engine, etc.)

In addition, it would presumably be difficult (or even impossible) to utilize such a pulley system on a bicycle with otherwise conventional industry standard components (gears, derailleurs, etc.). In other words, such pulley approaches might not be able to use an "off-the-shelf" set of gears.

Several examples of these shortcomings are further discussed below.

1. Pedaling Power Loss Due to Drive Torque Induced Suspension Movement ("torque reactive" suspensions).

All current bicycle rear suspensions of which the inventors are aware have a tendency to either compress or extend the rear suspension when subjected to drive chain and wheel drive loads. Designs that compress the rear suspension cause the rider's power to be used for compressing the shock absorber. The potential energy transferred to the shock absorber is dissipated as heat by the damping medium in the shock absorber. Designs that extend the suspension under load waste power by lifting the mass of the bike and rider with each stroke. Designs that attempt to exploit the chain loads to create torque against the suspension create a binding action of the suspension under pedal torque loads, which reduces ride quality and limits compliance-induced traction under hard pedaling.

Because an average human being can generate a maximum of about three quarters (¾) horsepower and can do so for only a very short time, and can generate only about ⅒ of a horsepower for extended periods, even small power losses can have a significant effect on the rider and the riding experience. In the designs described in the preceding paragraph, potential energy is typically returned out of phase to the pedals' and cranks' power stroke and is thus wasted as heat dissipated in the damper instead of power used to propel the bicycle forward.

In addition, suspension designs that are torque reactive feel mushy, sluggish and unresponsive to pedaling input.

Also, with a typical rear suspension design, the wheel follows an arc-like path when encountering a bump, forcing the wheel to be displaced in a forward as well as an upward direction (in contrast, and as shown by a comparison of FIGS. 3 and 6 of the preferred embodiment of the invention, as discussed below, the present invention provides much more nearly vertical wheel motion in response to bumps). Thus, when absorbing shocks, the prior art wheels must travel forward, frequently in an uphill direction. This increases the bump shock force transmitted to the sprung portion of the bicycle because the wheel is not moving perpendicularly away from the bump. It also requires more forward drive energy from the rider to overcome the resulting "rearward" component of such bump forces. Additionally, the suspensions will kickback that motion to the pedals, causing additional wasted energy and muscle irritation and premature fatigue from the uneven loading while pedaling.

This and other of the problems discussed herein are especially acute in human-powered devices such as bicycles, because the human power plant typically provides such low RPM that the jacking or torque reaction happens (and is felt) with each revolution, rather then just "once" as might be experienced under acceleration from an internal combustion engine, for example.

2. Lock up of the Rear Suspension Caused by Brake Induced Torque.

Almost all current art bicycle rear suspension designs place the anchor for their rear brakes (be it either a disc brake caliper or traditional rim surface caliper type brakes) in a position where the application of brake force causes an extending force or "jacking" to be exerted on the rear suspension. This "jacking" force causes the rear suspension to lose its effectiveness under heavy braking loads, as the jacking may lock out the suspension, and/or cause the rear of the bike to raise, forcing the rider forward and shifting the center of mass over the front wheel, thereby causing instability of the bike and rider. This jacking can manifest itself as "wheel hop" and instability under heavy braking on rough surfaces.

Current suspension designs (as opposed to rigid rear linkages) create this unsafe (or at least difficult-to-control) jacking. Some designs utilizing a disc brake will counter these jacking forces by anchoring the brake forces with a separate member attached to the frame away from the wheel suspension. Although this approach works to eliminate the brake "jacking" problem, it introduces additional weight and components (thus not lending itself to simple design), and may limit the bicycle frame's kinetic responsiveness (which is one of the main points of having a suspension in the first place). Other brake arrangements actually stiffen or even lock out the suspension while braking, even though arguably the most important time for suspension functions are likely demanded while braking for obstacles or rough and technical terrain.

3. Proper Shock Absorber Motion Ratio.

The motion ratio of the bike's shock absorber is critical to proper suspension operation. The motion ratio of the suspension bikes currently on the market runs the range from rapidly rising to rapidly falling. There are major drawbacks as you move toward either end of the spectrum.

A very rapid rising rate causes the suspension to be too soft and active in the initial part of the wheel travel, causing bobbing and wasting pedaling energy while quickly blowing through the initial travel on big bumps and "G-outs" (high load, long duration bump impulses), while eventually becoming non-compliant and harsh at later portions of the shock absorption motion. A rapid rising rate is caused by small "bell crank" shock rockers (or "rocker arms " or "rocker links" or "upper swingarms") where the motion ratio is vastly changed through the suspension stroke due to the great change in angle created by the small rockers. Among other things, air shocks do not work well with rising rate suspensions as an air spring also has a rising rate which results in a very rapid rising rate.

A falling rate is the worst case scenario for a mountain bike's suspension. A falling rate suspension is initially stiff and gets softer as the suspension travel goes through its stroke. A falling rate suspension is stiff and non-compliant on high frequency "stutter" bumps, while still blowing through the travel, bottoming out with great force on big bumps.

A suspension with a slight falling rate can work fairly well when combined with an air shock. Due to an air spring's progressive nature, the resulting combination is a nearly linear wheel "motion" rate. However, when a stiff spring is selected on a falling rate bike to prevent excessive bottoming, the suspension is very stiff and almost non-existent on small or ripple (or "stutter") bumps.

In contrast, and as discussed herein, the preferred embodiment of the current invention provides a frame having an almost linear (described herein as "progressively linear") motion ratio. Persons of ordinary skill in the art will understand that perfect linearity would occur if the first 1 inch "compression" movement of the bicycle wheel resulted in ¼ inch of compression of the shock member and every further 1 inch increment of bicycle wheel "compression" movement likewise corresponded to ¼ inch of shock member compression. A graph of representative prior art motion ratios, as well as the motion ratios for the instant invention, is set forth in FIG. 3C. Because the preferred "frame" of the suspension behaves linearly, a user can "make" that same frame function either with a generally linear or progressive motion ratio, via the selection or adjustment of the shock absorbing member (which members come in a wide range of motion ratios and characteristics). As further described below, the preferred invention includes using longer rocker arms than any prior art of which the inventors are aware. The "rocker arm" is in fact so long that it is very nearly appropriate to call it an "upper" swingarm (in distinction from the "lower" swingarm element present in both the instant invention and (in broad concept) in many prior art designs. As indicated above, those prior art designs typically use a lower swingarm with the upper linkage formed by a "bell crank" or "rocker arm ".

This long "upper rocker arm " in the preferred embodiment of the invention (along with the configuration and relative dimensions of the nose of that rocker arm) helps accomplish the desired alignment of the pivots in the linkage of the instant invention. This alignment accomplishes the linkage's desired tracking of the "instant center" ("IC ") so that it remains on or very near the chain tension line of the drive chain (thereby reducing or eliminating undesirable chain torque). In the preferred embodiment, as described herein, the linkage's tracking keeps the IC on (during normal operating "laden" [meaning having the rider aboard the bicycle] mode of suspension) or very near (during any other point of suspension travel) that chain torque line. No other bicycle suspension (even other "four bar linkages") of which the inventors are aware provides this beneficial tracking and/or the initially laden orientation.

4. Mechanically Simple, Elegant Design.

To address the various factors that determine performance of wheel suspension, bicycle rear suspensions have evolved into a wide range of complicated, typically unreliable, "Rube Goldberg"-like devices.

In addition, it is generally more economic if a design can utilize "standard" or "off-the-shelf" components, such as drive train and brake components, rather than requiring those components to be custom designed and manufactured.

Existing devices typically suffer from one or more of the foregoing exemplary shortcomings, in various degrees and combinations. Examples of some of the most common rear suspension designs are described below.

1. Horst-Link McPherson Strut.

Pioneered by AMP research, and used by Lightspeed, Rocky Mountain, Intense, Turner, Specialized and others.

The basic operating principle of these devices is illustrated in U.S. Pat. No. 5,509,679 to Leitner. As shown there, the lower pivoting arm or chainstay's pivot axis is located at or below the horizon point of the tensioning run of the drive chain of the smallest chainring, and a rear swingarm pivot or lower link is located in front of the vertical axis of the rear axle and below the horizontal axis of the rear axles. This location provides a binding action, mentioned above, that resists chain-induced "jacking" up and down movement of the suspension. Among other things, the resistance to the chain-induced "jacking" is established by creating additional torques to counteract other torques and thus results in the aforementioned "binding".

Although this design is simple and lightweight, it has several negative performance indicators. While variations in designs utilizing a "Horst-Link" can incorporate to varying degrees some of the following desirable characteristics: somewhat non-pedaling force torque reactive, somewhat non-brake torque reactive, all "Horst Link" designs also exhibit to varying degrees the following undesirable characteristics (which one can generalize to have become accepted as the "state-of-the-art" in bicycle full-suspension designs): somewhat responsive to pedal kickback from bump loads under pedaling force, reduced suspension activity due to mild to severe binding action of the suspension geometry, and most Horst-Link, McPherson strut bicycle rear suspensions suffer from a falling rate shock absorber motion ratio which varies greatly with frame size. The rear part of the bicycle frames are very flexible, due to the fact that the shock absorber shaft is a major structural member of the linkage. Not only is the shock shaft a very poor structural member (in part, typically, because of its small diameter), but the additional "linkage" loading on the shock also causes the shock unit to heat up and sometimes bind, resulting in premature wear and failure. Also, the suspension action is somewhat affected by pedal torque input. Mild binding action of the suspension under pedal torque loads reduces ride quality and limits compliance-induced traction under hard pedaling. This is a significant disadvantage on steep rough climbs. Brake torque and cornering loads cause shock bind. Brake load causes the suspension to jack upwards slightly. This design typically reacts to some degree to both brake- and pedal-induced torque loads, which loads vary dramatically with frame size and gear selection.

In contrast, and as more fully explained herein, the preferred embodiment of the invention prevents all these unwanted characteristics, specifically by utilizing the "upper swingarm" or rocker arm to help: (1) control the motion ratio of the frame, allowing for a selectable linear or progressive shock motion ratio (accomplishable, among other ways, by selecting from a wide variety of off-the-shelf shock units); (2) reduce or eliminate wheel twist and similar forces, such as by using a shockstay clevis (see FIGS. 2D–2I, for example) which holds the rear of the rockers firmly against lateral flex, along with the preferred rocker lateral brace at the midpoint and the preferred 8-mm bolts at the four linkage pivots (calculations indicate that this upper swingarm/clevis/brace/bolts arrangement to be over 20% stiffer then the tubing used in most McPherson Strut designs; (3) have the linkage members' instant center track the chain torque of the bicycle throughout the suspension motion (thereby eliminating, by way of cancellation, rather then binding, or reducing chain torque energy waste, as discussed herein).

2. High Single Pivot.

Used by Foes, Mountain cycle, Bolder, Pro Flex, Cannondale, Marin, and others.

The basic operating principle of these devices is illustrated in U.S. Pat. No. 5,217,241 to Girvin. The main pivot of the suspension is located at a point slightly above the chainline of the large chainwheel. This provides a lifting moment to the suspension which is slight in the large chainring and greater in the smaller chainrings. The lifting moment is counteracts pedal and rider body movement-induced squat.

Although these designs can be somewhat simple in construction and somewhat non-pedal-torque reactive in a certain chainring-gear combinations, usually they are very pedal-torque reactive in the chainring farthest away horizontally from the pivot. In the small chainrings, these constructions typically lift the bike and rider with an energy-wasting "inchworm" bobbing effect with each pedal stroke and its accompanying chain torque. These suspensions do not respond to bump loads under hard pedaling, as bump force must overcome the lifting moment in order to move the wheels in reaction to a bump. Also, due to their arc-like wheel path during shock absorption motion, the wheelbase dimension changes throughout the wheel's stroke, causing kickback while pedaling. These designs are usually very brake-torque reactive, which causes the suspension to extend and lock out. These typically require a bulky and sometimes heavy swingarm, as well as a huge overbuilt pivot and pivot supports, to maintain sufficient or desirable rigidity.

This prior art suspension is inexpensive to manufacture, but its performance is similarly limited, as described herein. It has only two parts (front and rear), and one pivot. Companies having a sufficiently large advertising budget can charge a high price and have a big profit margin on the suspension/bike, despite the marginal performance of the "high single pivot" suspension.

3. Unified Rear Triangle.

Used by Trek, Gary Fisher, Klein, Schwinn, Ibis, and others.

This is a newer single pivot that was introduced once the buying public figured out the shortcomings of the Single High Pivot discussed in the preceding section. Although the unified rear triangle is better than the Single High Pivot in most regards, it is not significantly better.

The basic operating principle of these devices is illustrated in U.S. Pat. No. 5,474,318 to Castellano. This design has a number of positive attributes: it provides correct natural frequency of the suspension, thereby allegedly avoiding any pedal-force-produced bobbing; the entire bicycle drivetrain (including the cranks, and thus the pedals and the entire bottom bracket assembly) is contained with the unsprung structure of the rear suspension, thereby eliminating any chain-induced suspension bobbing and pedal kickback; using the rider's legs as part of the unsprung structure of the rear suspension purportedly allows the rider to "adjust" the suspension on the fly by consciously stiffening or loosening his legs; positive shifting due to lack of suspension-induced chain whip; it can be somewhat non-pedal-torque reactive depending on pivot location; provides a relatively smooth ride while seated, with no kickback effect through the pedals; and is a very simple design.

Nevertheless, suspensions of this type have some important limitations. They can be very pedal-torque-reactive depending on the pivot location. Bicycles with this suspension design usually suffer from a severe pedal-force-induced bobbing effect. The suspension effectiveness becomes compromised when a rider is standing, to a very large degree in some designs depending upon pivot location. This problem is substantial, in view of a rider's natural tendency to stand so that their legs can be used as shock absorbers and to improve their balance in extreme conditions. A unified rear triangle suspension becomes less effective while the rider is standing because the cranks and thus the pedals are attached to the rear "triangle" (which is the unsuspended structure of the bike frame), which is the opposite of what is needed (riders typically stand during extreme conditions, when shock absorption is needed most). Depending on the pivot location, brake torque usually causes these designs to compress and pre-load or extend and lock up. This design also usually suffers from an extreme lack of rigidity during out-of-line loading (such as occurs during cornering) due to using a single pivot which has approximately the same moment arms with respect to the wheel's contact patch (the area where the tire contacts the ground) as does the wheel's axis. When cornering or under similar loading conditions, that near identity of moment arms provides very little, if any, resistance to sideways twisting of the wheel. Because of this, the pivot, frame and swingarm must be overbuilt to maintain sufficient strength.

In contrast, the preferred embodiment of the invention has the crank and pedals attached to the suspended frame member (the front section of the frame), so that the rider gets the benefits of being "suspended" (shock absorption, etc.) regardless of whether the rider is sitting or standing. Moreover, the preferred embodiment of the invention includes a linkage with moment arms (with respect to the wheel's contact patch) that provides substantial resistance to wheel twisting during cornering and the like, without having to overbuild the size of the components.

Perhaps as a result of the shortcomings of the unified rear triangle design, it has never (to the knowledge of the inventors) been raced by a factory team of any of the major companies in the bicycle industry.

4. Multilink, Low Main Pivot.

Used by GT, Turner, Intense, KHS (the foregoing are all four-bar linkage designs) Ventana, Mongoose, and Diamond Back (the last three utilize a swing or bell crank linkage).

The basic operating principle of these devices is illustrated in U.S. Pat. No. 5,441,292 to Busby and U.S. Pat. No. 5,678,837 to Leitner. The ride quality is improved by isolating bending moments from the front triangle by relocating the shock absorber to the rear link area of the suspension. The shock absorbers' motion ratio is held close to linear due to the positioning of the shock absorber and links. The wheel travels in a near vertical path, instead of an arc, thus increasing shock absorbing efficiency and reducing energy wasting wheel fore and aft oscillations. Although some but not all four bar links are currently the most mature designs and are acknowledged by many people to be the best functioning of the current designs (because, among other things, a skilled designer has full control over shock motion ratio, brake torque reaction, and pedal torque reaction), there are still a number of disadvantages to the design. For example, currently most bikes using this design have been developed by trial and error with no clear understanding of all of the aspects of suspension function. Although some prior art linkage designs may approach the functional performance of the ICTT™ suspension (that of the present invention) in one aspect of suspension functionality, no single prior art design effectively addresses all of the identifiable aspects of suspension function as does the ICTT. Among other things, prior art designs do not move the instant center to "track" and thereby cancel chain torque. Indeed, similar to that mentioned above in connection with the '679 patent, the four-bar suspension system of the '837 patent tends to prevent "jacking" by creating a binding action resulting from the interaction of the torques created to counteract the chain-induced torques, instead of canceling chain torque by causing the instant center to track the chain torque line, as does the preferred embodiment of the instant invention. Designs range from relatively good (having superior suspension performance characteristics) to "Rube Goldberg" ridiculous. However, all of the current multilink designs suffer from at least one of the previously-identified faults: pedal torque reactivity, brake torque reactivity, bump induced pedal kickback reactivity, binding or stiffening of the suspension under pedal loads, improper shock motion ratio, and/or overly complex design. The relative flexibility of this design concept has resulted in some bizarre functioning, ill-conceived machines. Among other things, more parts, more material, results in higher manufacturing and maintenance costs and additional weight.

OBJECTS AND ADVANTAGES OF THE INVENTION

It is, therefore, an object of the invention to provide a suspension useful, for example, in connection with the rear wheel of a bicycle such as a mountain bike, which overcomes all of the shortcomings mentioned above.

Among other things, it is an object of the invention to provide a wheel suspension in which the instant center of that suspension substantially tracks the line of chain torque, thereby allowing the drivetrain and power through the drivetrain, be it from the pedals or the bumps, to be completely isolated from the suspension system and the forces it must respond to, and function from, including bumps, braking, etc. And at no time should the drivetrain's ability to conduct energy to the rear wheel be negatively affected or have a negative effect on the independent operation of the suspension function; thus reducing or eliminating chain torque force loss or effect due to one suspension attached to the bicycle and canceling the undesirable loss of pedal stroke power or loss of suspension function at any time.

It is an additional object of the invention to provide a wheel suspension in which, for any compression position of the suspension, the instant center always falls between the maximum and minimum chain force lines. This provides the opportunity for a rider to select a gear (between the range of maximum and minimum) that very closely or exactly hits the IC, regardless of the compression position.

Another object of the invention is the provision of a suspension that isolates brake torque and its negative effects.

Yet another object of the invention is the provision of a suspension in which the shock motion ratio of the frame is linear or linearly progressive.

A further object of the invention is the provision of a wheel suspension in which "off-the-shelf" components may be readily used, such as gear sets, drive trains, brakes, etc.

Another object of the invention is the provision of a suspension in which a desirable amount of anti-squat is provided.

Yet a further object is the provision of a method of designing bicycle frames, which assists the designer in balancing various attributes of the frame and bicycle and suspension. Such method can include, among others, steps of:

identifying the average (or constant, if in a single chain line system is used rather then a cluster of gears and several chainrings as described in the preferred embodiment herein, which is currently the norm or industry standard gearing systems for high performance bicycles) chain torque line of a given set of gears or of a single gears while the bike is in a laden position. Bikes are not ridden in other then a laden position, so good suspension design takes into account the weight of a rider and the resulting normally laden suspension position;

selecting a location on that chain torque line that represents the desired IC for the frame. Factors affecting this selection include the amount of anti-squat (as discussed herein) one desires to build into the system. Also, and as described elsewhere herein, the desired motion ratio of the linkage affects the selection of the IC position, and typically the shorter the linkage and closer the IC to the suspension, the less effectively the suspension's IC will track the Chain Torque Line, and less effective the Brake Torque Isolation will be. To lower the percentage of anti-squat, the IC needs to be further out (toward or beyond the front wheel); to increase the percentage of anti-squat), the IC needs to be closer to the rear wheel. Motion ratio is improved by selecting a rocker arm length close to that of the lower swingarm.

To provide desirable Brake Torque Isolation performance, the rear of the link must permit brake loads to be imposed at near 90 degrees (nearly perpendicular) as described elsewhere herein;

using that selected location as the origin, projecting from that origin to select upper and lower axes for the frame members of a 4-bar (or other) suspension linkage. For 4-bar linkages utilizing the method of the invention, the lower rear pivot needs to be sufficiently close to a line between the rear axle and the center of the crank to avoid having that pivot hit by standard (off-the-shelf) derailleurs; the front lower pivot similarly needs to be sufficiently low to avoid being hit by any front derailleur and to ensure that the derailleur can be mounted at all, and sufficiently high to avoid excessive width behind the bottom bracket area (which width might, for example, cause mud to excessively collect and block the rotation of the tire in adverse conditions). Persons of ordinary skill in the art will understand that there are many other clearance issues in this area of frame and bicycle design, to make sure that the parts (especially those that move) do not undesirably rub, hit, or otherwise interfere with one another. The lower pivot locations must also be out of range of the rear derailleur to avoid "chain slap" (contact between the chain and the suspension structure, such as occurs in the many current art designs (Specialized, GT, AMP, etc.));

selecting the location for a shock absorption member. This location is preferably chosen so that standard (off-the-shelf) shock sizes can be used, and preferably to permit using a shock with sufficiently long stroke to keep the motion ratio low (as discussed herein) and to avoid excessive loads. Preferably, the shock is located and configured within the linkage so that the angles of the shock in relation to the linkage provide for a linearly progressive or straight rate motion ratio;

selecting the lengths of the various linkage arms (some of the preceding section also relates to selecting the lengths of the linkage arms). In the preferred embodiment, particularly the length of the upper link (between the upper pivot points) is based on the desired travel (total movement up and down of the linkage) for the linkage as well as the desired motion ratio of the suspension (which may, for example, allow for a broad selection of shock mediums). In addition, the design (including the linkage arm lengths) needs to take into account structural forces such as where various loads will intersect the front structure (such as elements 1–4 in FIG. 1). For example, loads applied in the middle of the seat tube 1 may lead to premature failure of that tube 1 under extreme loading situations. In the preferred embodiment of the instant invention, linkage arms (and their associated force loads) attach close to tube intersections of a generally conventional "front triangle" (such as represented by elements 1–4 in FIG. 1), to utilize the strength of those intersections. The amount of linkage travel can be adjusted by manipulating the ratio between the length of the front (or nose) of the rocker (the length of arms 6, 7 from pivot F forward) and the rear of the rocker (the length of arms 6, 7 from pivot F back to pivot E). Also, in 4-bar linkages such as the preferred embodiment, the length and location of this upper swingarm must be carefully coordinated with the length of the other suspension structural members to achieve the desired amount of BTI (Brake Torque Isolation geometry). As discussed herein, the angle between the suspension structural members attached to the upper rear pivot can directly affect and determine the BTI of the suspension. If the upper linkage arm is too short, not only will the suspension IC not closely track the chain torque line, the suspension will not provide desirable BTI geometry to reduce or eliminate problems from brake torque loads. Such brake torque load problems are very common in current four-bar linkage designs (including the TRUTH shown in FIGS. 13a–c, GT STS/LTS designs, Specialized FSR designs and others);

generally, from the beginning or from this point on, CAD (computer-aided design) modeling of a myriad of configurations can help determine the best possible configuration to achieve a desired balance between the elements of the design. Among other things, CAD modeling of loads and torques can help determine a desirable configuration to establish and maximize ICTT of the chain torque, the closest possible BTI geometry to reduce or eliminate the effects of Brake Torque on a suspension linkage, maintain a near-vertical wheel travel path, keep linkage motion ratio and shock motion ratio in the desired range, and select the packaging, complexity of manufacture and ability to utilize industry standard parts;

design the parts. The rockers (the upper swingarm), being long and low (the rockers' position is preferably low relative to most current art, which allows the bike of the invention to have a low standover height with a relatively large amount of travel), preferably maintain good stiffness torsionally from wheel twisting loads on the linkage. The preferred embodiment and method further includes a one-piece machined swingarm yoke and a shockstay clevis machined from a solid piece of material, to help maintain near-perfect alignment and excellent strength. Also, the "Rocker Block" (see FIG. 2J) helps maintain a desired amount of rigidity in the upper rocker arms without interfering with or contacting the tire and seat post (which move between the rocker arms while the linkage is in motion).

In addition to providing a solution to each of the various problems discussed above (many or all of which could be utilized in a suspension design without the other elements of the invention), the various solutions can be practiced in a variety of combinations with each other, and are preferably all included in the preferred embodiment and methods.

Our preferred design is also very light and simple, which minimizes the disadvantages of weight (indeed the preferred embodiment of the 7" travel Dare weighs between 15%–50% less then it's nearest competitors. Literally, it is the lightest 7" travel FS bike in the world today. In fact the Dare weight is comparable to the shorter 4" travel cross country offerings of Specialized, Turner, GT and Intense), but even more importantly, our design greatly reduces or eliminates the "power sucking" of chain torque and other loads that occur with prior art designs, as discussed above.

We sometimes refer to the invention as Instant Center Tracking Technology (or "ICTT"). We created and developed ICTT to eliminate the foregoing suspension design problems. In its preferred embodiment, ICTT is characterized by a four-bar linkage with specifically positioned pivot points and one or more shock absorption elements, resulting in improved performance through, among other things, desirable alignment of various force and torque lines over the range of expected rider loading, pedaling, and shock impacts.

Other objects and advantages of my invention will be apparent from the following specification and the accompanying drawings, which are for the purpose of illustration only.

BRIEF DESCRIPTION OF THE DRAWINGS

All of the drawing figures filed herewith and discussed herein are simply representative illustrations of the current preferred embodiment of the invention. Persons of ordinary skill in the art will understand that a wide variety of other embodiments can be utilized to practice the invention.

FIG. 2 is a side elevation view similar to FIG. 1, but emphasizes the brake torque isolation geometry at various points of compression of the shock absorber. FIGS. 2A–2C are all similar to FIG. 2, but each one "breaks out" a single one of the compression stages ("laden" [2A], mid-point [2B], and full compression [2C]) shown in FIG. 2. Among other things, these Figures illustrate how the invention reduces or eliminates squat or "jacking" under a wide variety of loading conditions; prior art suspension designs that use small rockers or links of greatly unequal length (perhaps to maintain the traditional rear "triangle" appearance of a bicycle) or otherwise differentially size the suspension pivoting elements cause the brake force resistance plane and the instant center to move greatly in relationship to the drive chain line, causing less desirable performance than can be accomplished with the instant invention. As shown in the drawings, the present invention's rocker arms are approximately the same length as the lower yoke or "swing arm";

FIG. 2G is an end view taken along the broken line 2G—2G of FIG. 2D. This assembly preferably includes the "shockstay clevis" (FIG. 2I) (preferably designed and fabricated from suitably strong, lightweight material, to carry various structural loads and maintain desired linkage alignment for the upper swingarm or rockers (see FIG. 2E)), which "shockstay clevis" is preferably welded or attached to tubular material extending downwardly to a "dropout" portion (the lower, forward-extending portion in which the lower rear pivot D is located) of the shockstay assembly (FIG. 2G). The "dropout" is also preferably machined to help maintain alignment of the pivot and wheel axle mounting area;

FIG. 2H is a side elevation view taken along the broken line 2H—2H of FIG. 2G, illustrating the preferred "shockstay assembly";

FIG. 2I is an end view similar to FIG. 2G, but illustrating specifically the "shockstay clevis" (the "horseshoe" shaped upper portion) of the assembly of FIG. 2G. As indicated above, the clevis is preferably machined from one piece of any suitably strong, lightweight material capable of providing the desirable tolerances for rocker mounting and brake stud location. The clevis also provides both vertical reinforcement and horizontal strength from torsional loads, helping to spread any twisting or compressive forces, especially as those forces are commonly encountered on the extreme terrain for which the bike's use was intended;

FIG. 2J is a top view isolating the spacer clevis element or "reinforcement block" or "Rocker Block" of FIG. 2F. Together with the shockstay clevis (see FIG. 2I), this block helps provide lateral and torsional strength for dynamic loads induced by the contact patch of the rear wheel against the ground. These forces occur regularly during the bike's use, such as during cornering or G-Outs (which can be caused by jumping or extreme terrain riding). Among other things, the "Rocker Block" is preferably fabricated from a single piece of strong, lightweight material, and shaped with ends each having a radius that matches the inside surfaces of the rocker arms 6, 7 against which those ends mate (see below). The block is preferably attached to each rocker arm using two 6-mm screws (for a total of four screws, two on each end), although persons of ordinary skill in the art will understand that a wide range of reinforcement devices and attachment means therefor can be utilized to provide the desired stiffening and support. Among other things, the stiffening block could even be cast as an integral part of the upper rocker arms assembly. The "Rocker Block" is preferably designed in a diamond cross-section (see FIG. 2L) to provide as much torsional strength as possible without contacting the seat tube or tire when the suspension is fully compressed (for example, see the location of the rocker block on FIG. 1 showing the linkage in fully compressed position). The rocker block is preferably removable to, among other things, allow the assembly to be removed and serviced. As indicated above, it would be possible to make the rocker block one piece with both rocker arms, but the two nose sections of the rocker assembly (extending forward toward the front wheel, on opposite sides of the bike) would still preferably be formed or fabricated so as to taper toward each other. Without such tapering, the nose section of the assembly may be too wide and rub or contact the riders legs causing injury or irritation to the rider;

FIG. 2K is a side elevation view taken along the broken line 2K—2K of FIG. 2I, further illustrating the preferred "shockstay clevis";

FIG. 2L is a sectional view taken along the broken line 2L—2L of FIG. 2E, further illustrating the preferred "rocker block";

FIGS. 4A–C are side elevation views similar to FIGS. 2A–C, but each illustrating the "instant center" for a given amount of compression (4A illustrates full compression, 4B a mid-point of compression, and 4C a "laden" or rider-mounted compression), as well as the alignment of exemplary chain torque lines for various gear selections during the indicated amount of compression. In the preferred embodiment, the IC is initially in exact alignment with the average chain torque line (when the suspension is in its normal, laden position). Also preferably, that initial IC position is in front of the bottom bracket or crank center of the bike (as just mentioned, on that "average" torque line) and preferably is spaced correctly on that line to provide a desired amount of anti-squat performance. Although aspects of the invention can be practiced if the IC is on or below ground level (such as alignment of the IC on the chain torque line, etc.), the preferred embodiment keeps the IC above ground level in order to (among other things) provide the anti-squat performance and benefits described herein. This preferred initial IC positioning is not found in any prior art of which the inventors are aware. The average, minimum, and maximum chain torque lines remain roughly constant for any bike design (or chain driven suspended drive wheel system) that uses current "off-the-shelf" drive train components. Any chain-driven or shaft-driven system can benefit from the tracking of the IC, however, if that chain or shaft torque is susceptible to being "canceled" or reduced by the proper alignment of the IC. Among other things, the invention provides a ratio or percentage of torque line movement about the IC that is smaller for any selected gearing combination than in prior art systems, resulting in lowered or eliminated chain torque reaction from the suspension linkage in any one aligned gear, or range of gears. Note that the drawings show the chain torque line of a set of typical XC (cross-country mountain bike) gears. Such gears physically diverge more than a typical set of DH (down-hill) gears, and embodiments of the invention for various applications (XC, DH, or others) thus can include an application-specific shockstay or other components to further improve the performance of the invention for that particular gear set (such as to locate the instant center even closer to the DH or other gear set average chain torque line). Note also that several of the illustrated compression/chain torque combinations are unlikely to ever occur during use of the bike. For example, it is unlikely that minimum chain torque (see the right, lowermost line in FIG. 4A) will occur while the wheel is at its maximum compression (which maximum is controlled by the shock absorption member);

FIGS. 7–12 illustrate (in very crude, not-to-scale, stick-figure form) some of the broad concepts incorporated in prior art designs;

FIG. 13A–C are similar to FIGS. 2A–C, but show a bike frame (named "TRUTH™") already marketed by one of the instant inventors (Mr. Ellsworth);

FIG. 15 shows the shock rigidly mounted from above and compressed from the lower swingarm. FIG. 16 and FIG. 18 show similar embodiments which utilize a pull shock configuration with the shock mounted similarly to FIG. 15 in location but rigidly mounted at the bottom and pulled in compression of the linkage by its mount from the upper swingarm or rockers. FIG. 19 shows the shock mounted in either of two forward positions. FIG. 20 and 21 show the shock compressed by a midpoint mount along the upper swingarm. While most of the alternative embodiments share some characteristic of current art, none of the current art using the shock mounting locations shown currently aligns the linkage to track the chain torque line with the linkage's IC, or take advantage of other (or certainly all) elements of the instant invention.

DESCRIPTION OF PREFERRED EMBODIMENT

In the preferred embodiment of the invention, as illustrated in FIGS. 1–6, the suspension is constructed to provide important and desirable benefits and improvements over current suspension shock absorber devices, constructions, and apparatus.

The various components of the invention may be fabricated in a wide variety of ways and from a wide variety of materials, all of which will be readily understood by persons of ordinary skill in the art. Among other things, it is preferable that strong, lightweight materials be utilized, to reduce the energy required by the rider during riding as well as during other transportation of the bicycle (such as loading onto bike racks, etc.).

Figure 21:
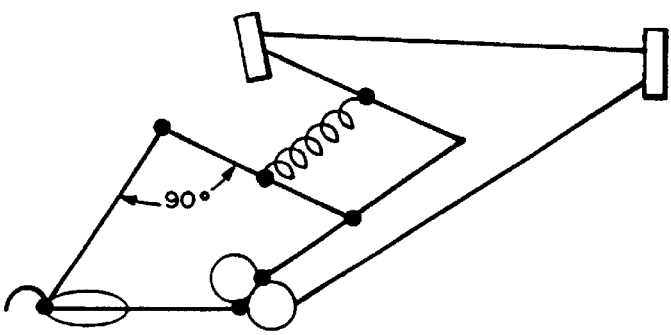

In FIGS. 1–6, the suspension apparatus of the invention preferably includes a forward bicycle frame assembly consisting of a seat support tube or assembly 1, upper frame tube ("top tube") 2, lower frame tube ("down tube") 3, fork support tube ("head tube") 4, and crank axle housing tube ("bottom bracket shell") 5 welded together into a roughly triangular construction. Among other things, however, the front of the bicycle may be configured in any of a myriad of ways to support a linkage designed to cancel chain torque using an instant center tracking and cancellation as described herein. For example, one currently popularized configuration is that of a "Y" design, and FIG. 21 illustrates how such a design might incorporate the benefits of IC tracking set forth herein. Persons of ordinary skill in the art will understand that this portion of the bicycle frame is shown herein as the "suspended" portion, in that it is suspended from direct impacts on the rear wheel, as described more thoroughly below.

Figure 6:
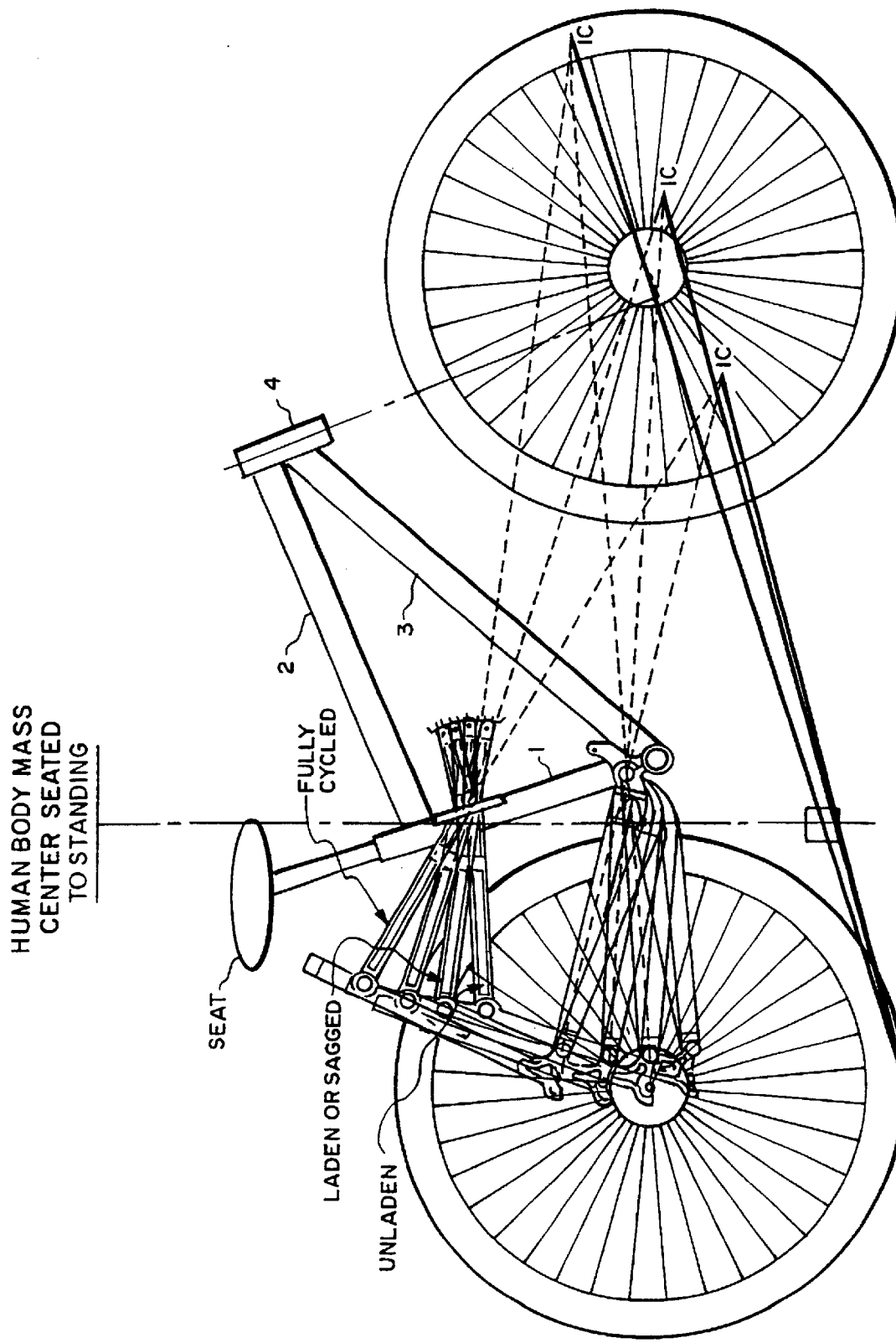
FIG. 6 is a side elevation view similar to FIG. 1, but illustrating some of the anti-squat characteristics of the preferred embodiment.
Figure 14:
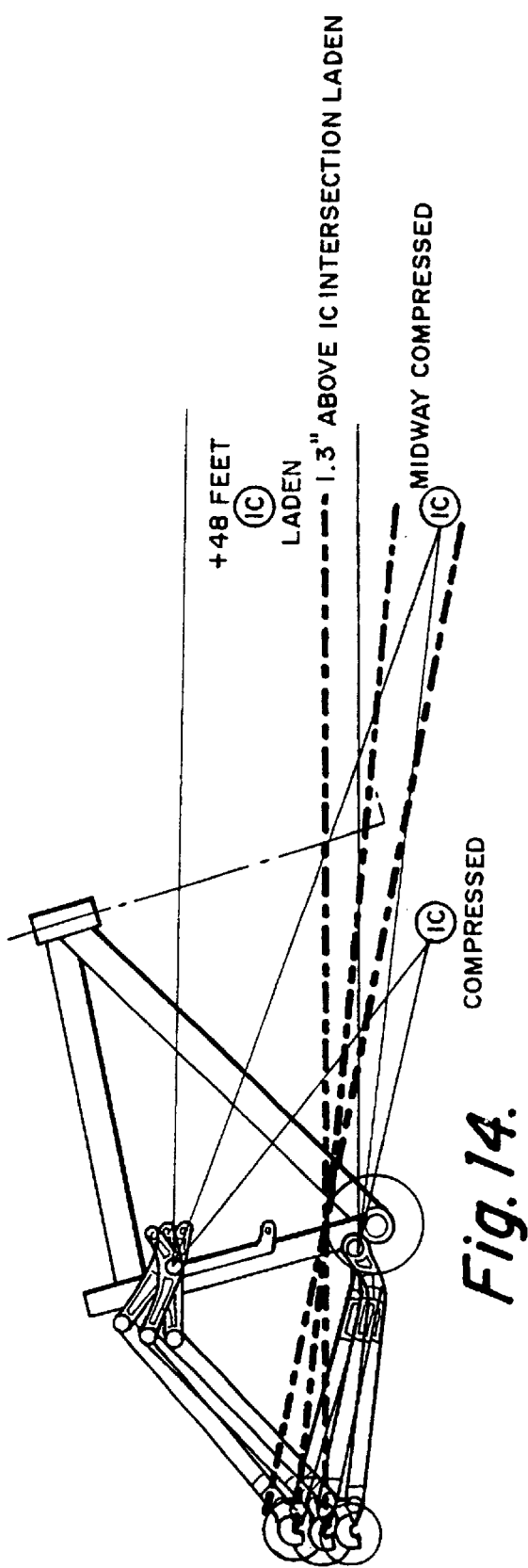
FIG. 14 is similar to FIG. 5B but illustrates Mr. Ellsworth's TRUTH bike frame, and FIGS. 14A–C each "break out" and correspond to one of the three compression states shown in FIG. 14. Persons of ordinary skill in the art will understand that the chain drive lines in FIGS. 14 and 14A–C are chain torque drive lines for average gearing selections.
Figure 14A:
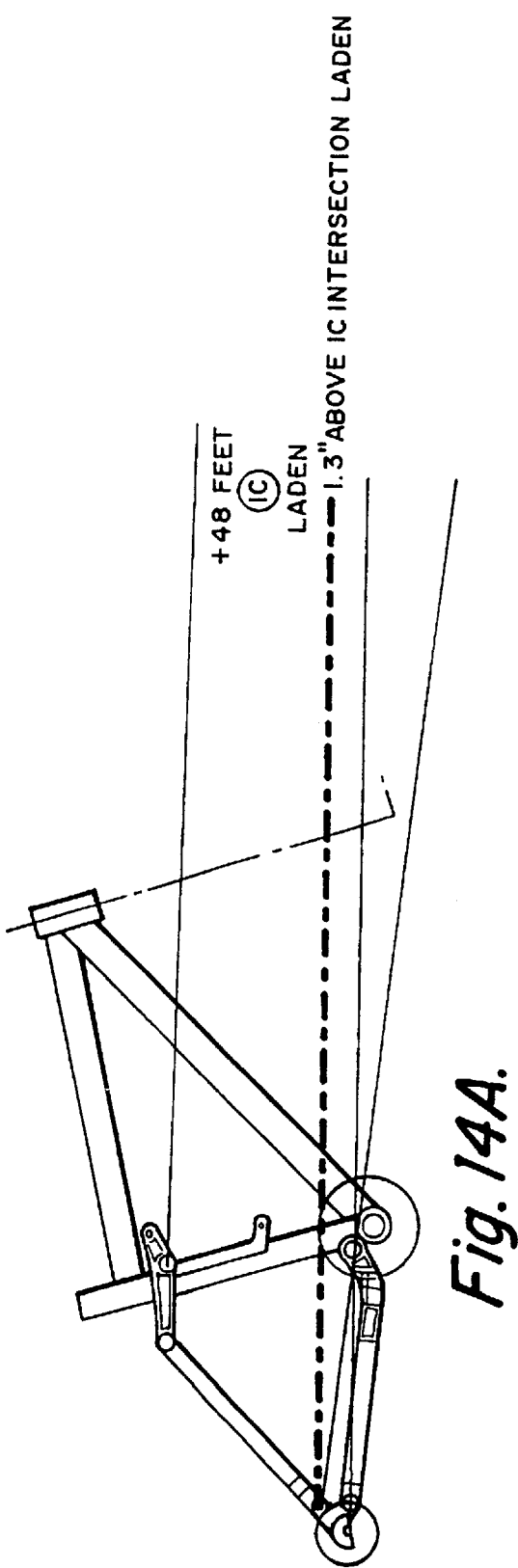
Figure 14B:
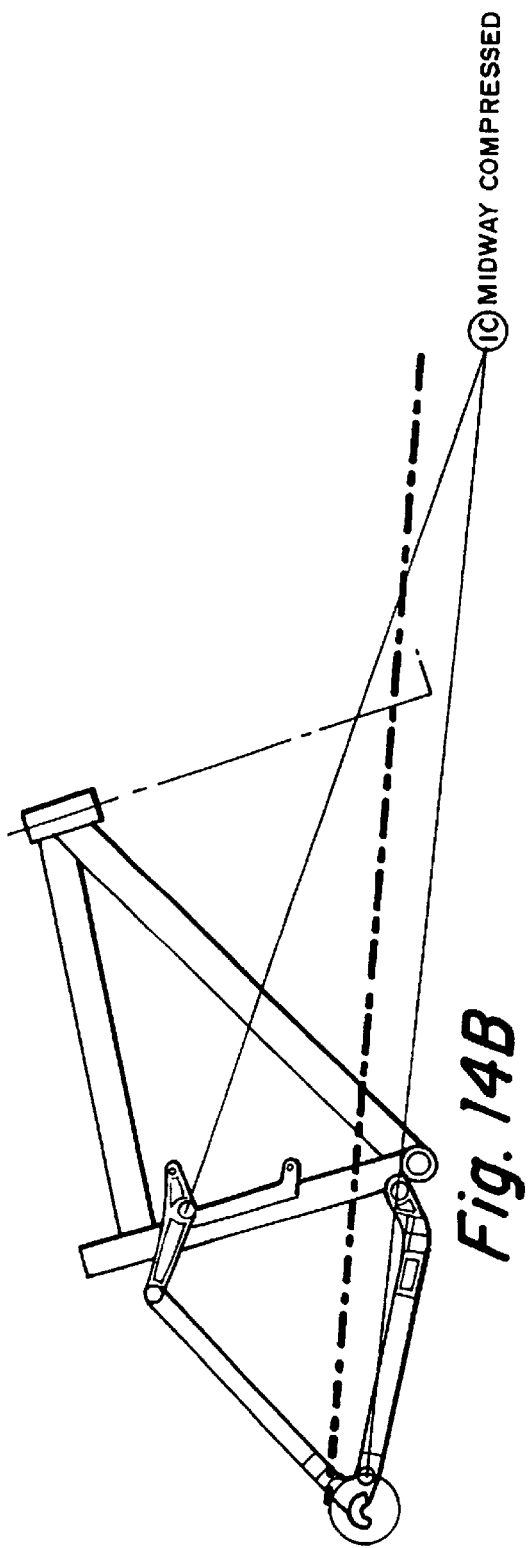
Figure 14C:
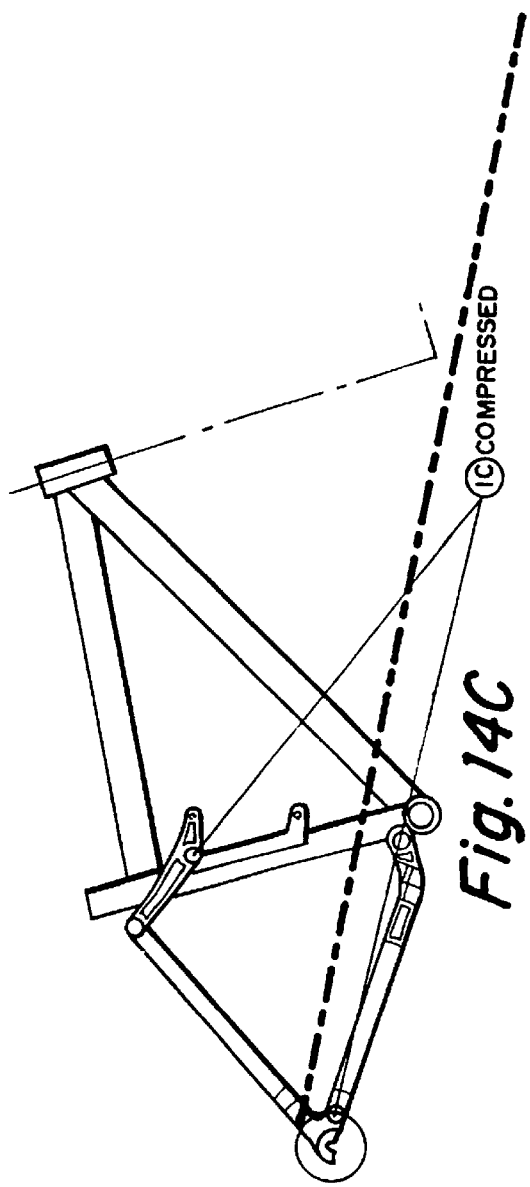
Figure 15:
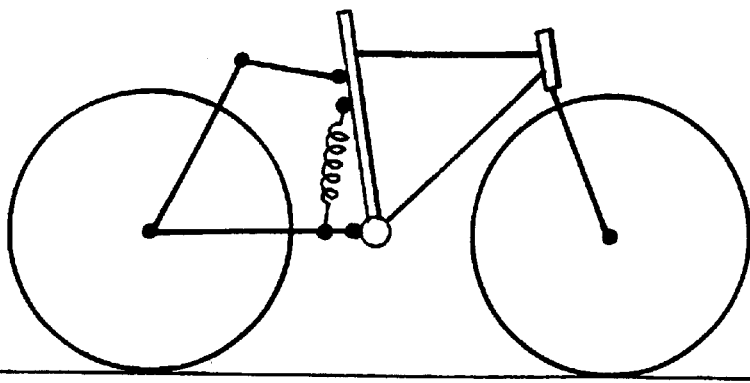
FIGS. 15–21 illustrate (in very crude, not-to-scale, stick-figure form) some of the many alternative embodiments of the invention, each of which incorporate certain of the beneficial aspects of the invention. Within those Figures, persons of ordinary skill in the art will understand that the suspended portion of the bike frame is illustrated as being to the right in each figure, the suspension to the left, and the shock absorbing member generally as a squiggly line (sometimes 2 are included within a single figure to illustrate alternative locations for the shock).
Figure 16:
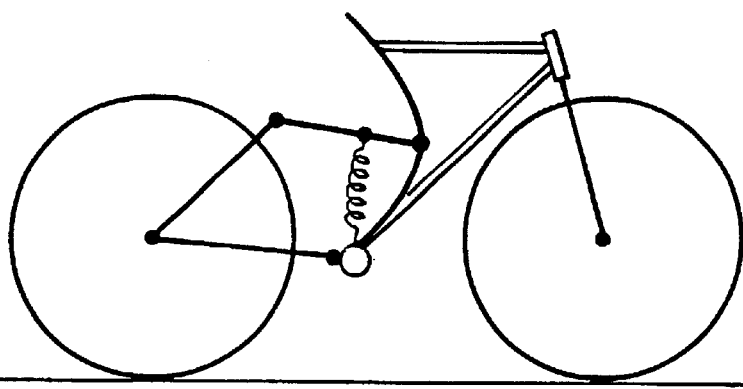
Figure 17:
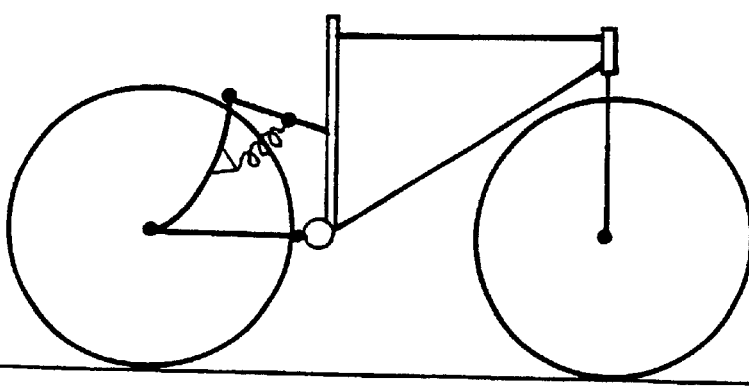
Figure 18:
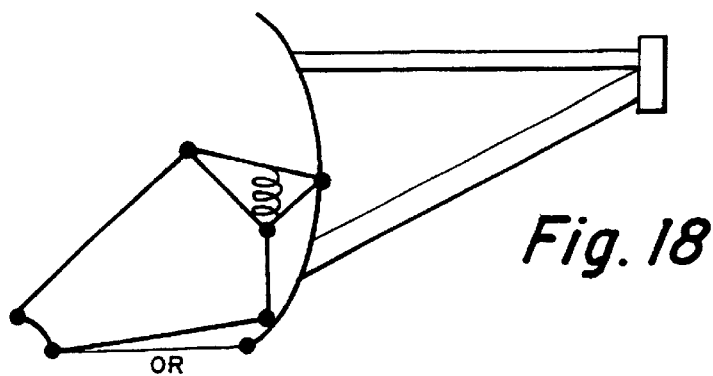
Figure 19:
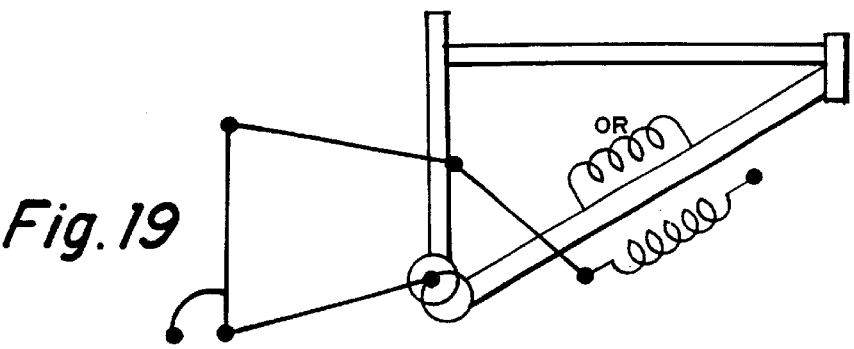
Figure 20:
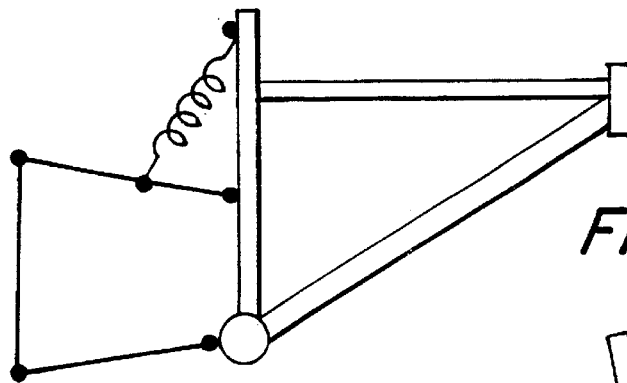

Front and rear wheels 20 and 30, respectively, are shown, but no seat or steering wheel handle is shown (FIG. 6 does include a sketch of a seat member). Persons of ordinary skill in the art will understand that certain wheel spokes have been conveniently omitted from the drawing that would exist in the actual preferred embodiment.

The rear wheel suspension portion of the suspension preferably includes two upper rocker arms 6 and 7 (element 7 is directly behind and hidden by element 6 in FIG. 1, but is preferably the mirror image of element 6 on the opposite side of the bicycle) pivotably engaged with the seat tube 1 at point F, near the respective midpoints of rocker arms 6 and 7.

Figure 1:
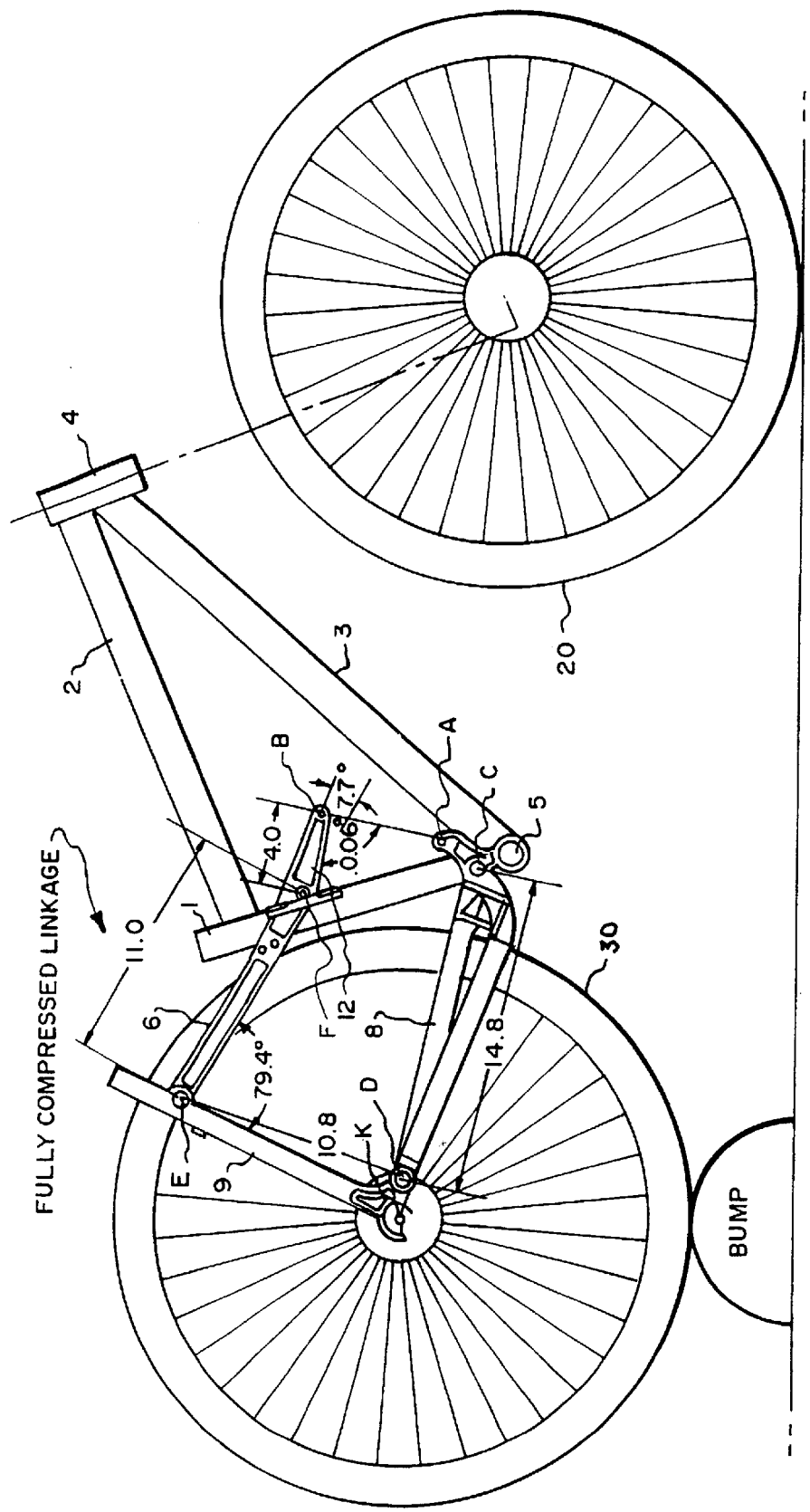
FIG. 1 is a side elevation view of a preferred embodiment of the invention, but without a seat, a steering wheel, or a shock absorption element (although the words "shock unit" indicate its preferred location). Preferred dimensions and angles are shown for the linkage in fully compressed position, although those of ordinary skill in the art will understand both that the proportion of the numbers to each other is the most critical thing and that the range of dimensions and angles covered by the invention is much broader than just the one illustrated in these Figures and includes the range of angles and dimensions closer to those illustrated than any prior art device or method.
Figure 1A:
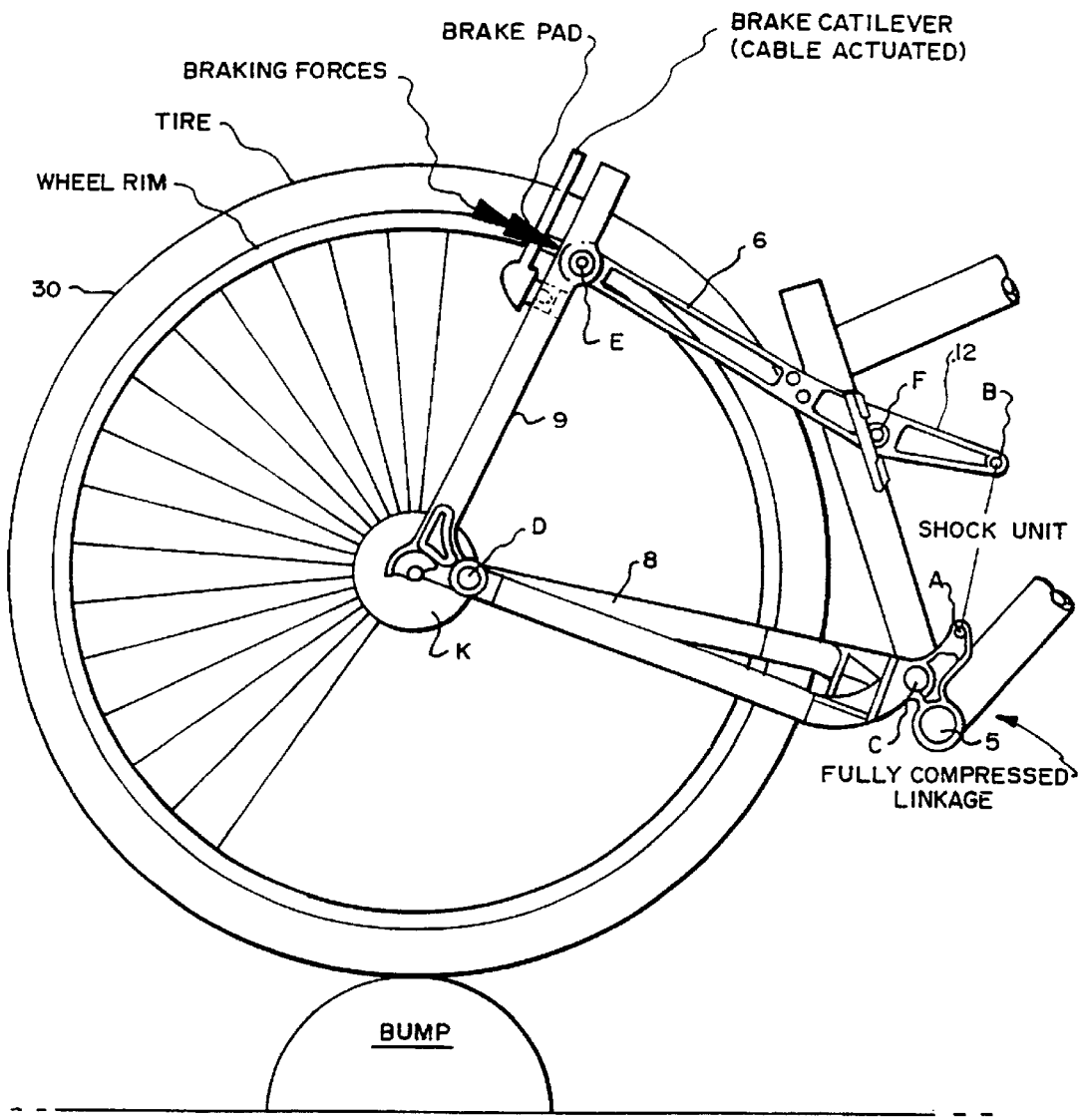
FIG. 1A is a partial, enlarged, broken side elevation view similar to FIG. 1, but illustrating further details regarding the preferred brake assembly and alignment thereof. Although a cantilever, cable-actuated brake is illustrated, persons of ordinary skill in the art will understand that other brake mechanisms can be utilized; among others, a disk brake on the shockstay member will benefit from using the invention's BTI geometry (said another way, the invention can be practiced using disk brakes, among others). Among other things, such persons of ordinary skill in the art will understand the assembly and function of the indicated brake pad and cantilever with the shockstay assembly (FIG. 2G)
Figure 2D:
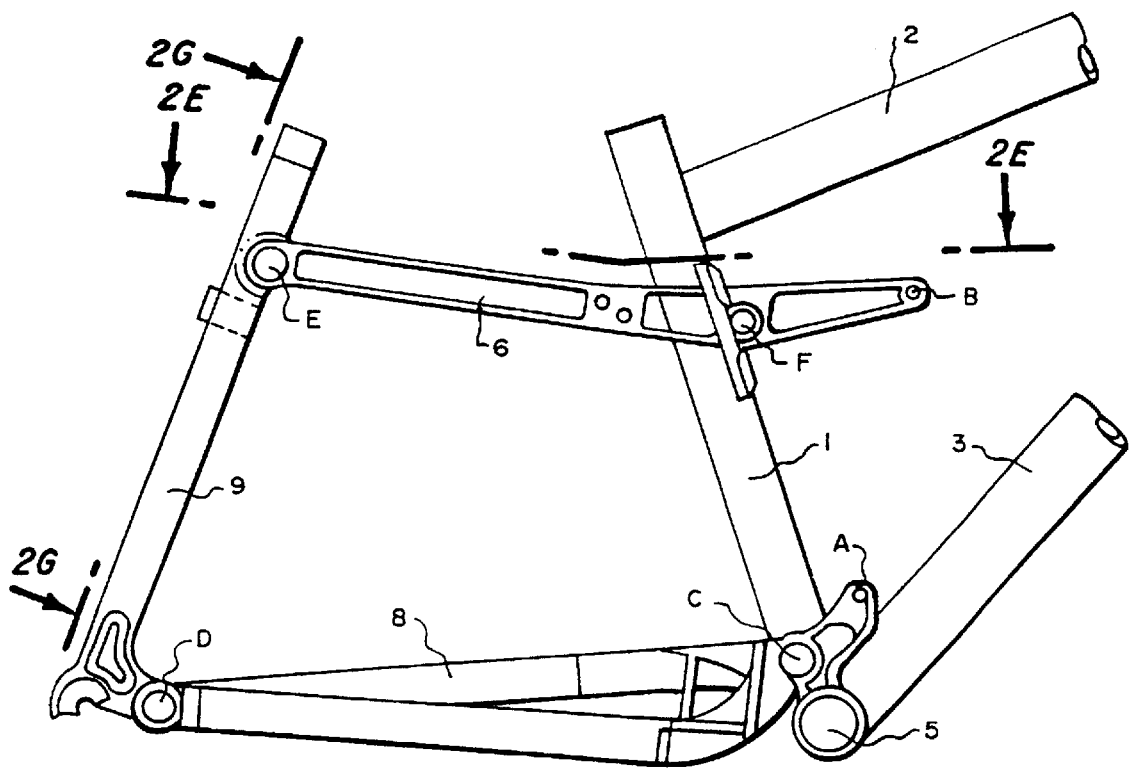
FIG. 2D is a partial, enlarged, broken side elevation view similar to FIG. 2A.
Figure 2E:
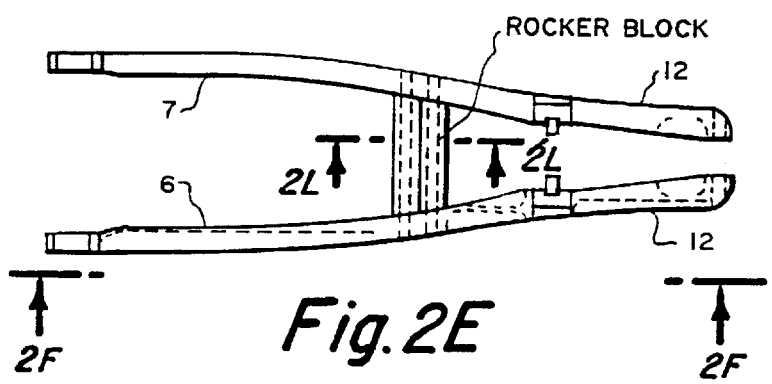
FIG. 2E is a top view taken along the broken line 2E—2E of FIG. 2D, illustrating the preferred upper swingarm assembly or rocker arms.
Figure 2F:
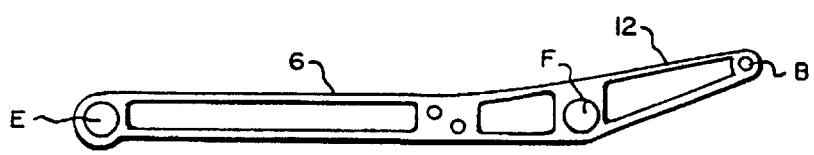
FIG. 2F is a side elevation view taken along the broken line 2F—2F of FIG. 2E.
Figure 3:
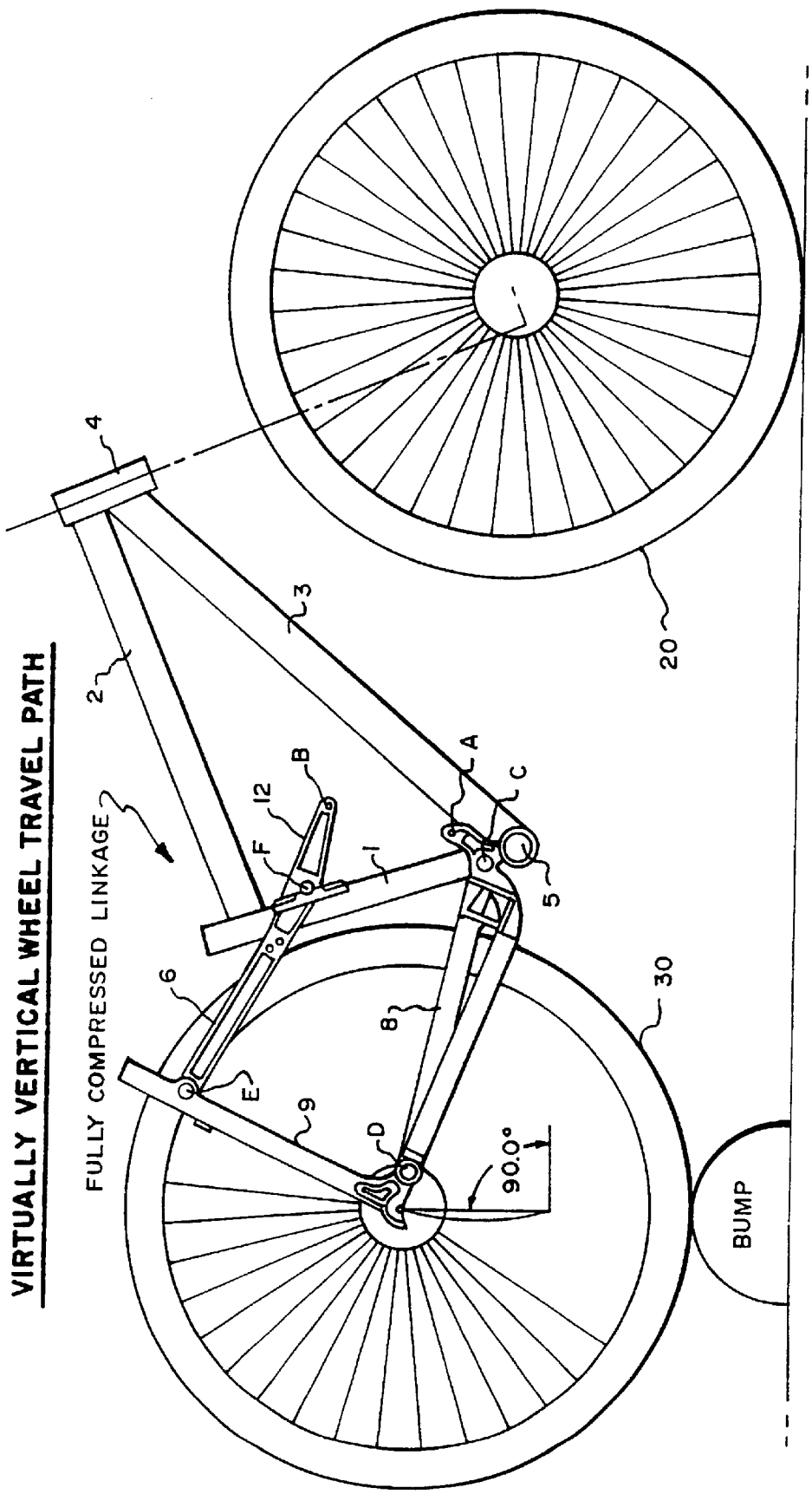
FIG. 3 is a side elevation view similar to FIG. 1, but illustrating the nearly vertical wheel travel path achievable with the instant invention. As explained elsewhere herein, anything less than purely vertical travel is generally less then optimally effective in absorbing a bump, and/or has the effect of pulling the bike and rider unnecessarily back toward the bump. This problem becomes more noticeable as greater compression "travel" is permitted within the suspension. For example, the problem is very noticeable in most current art designs having 5+ inches of suspension travel. Some current art suspensions with even less then 5" travel do not keep wheel travel close to vertical.
Figure 3A:
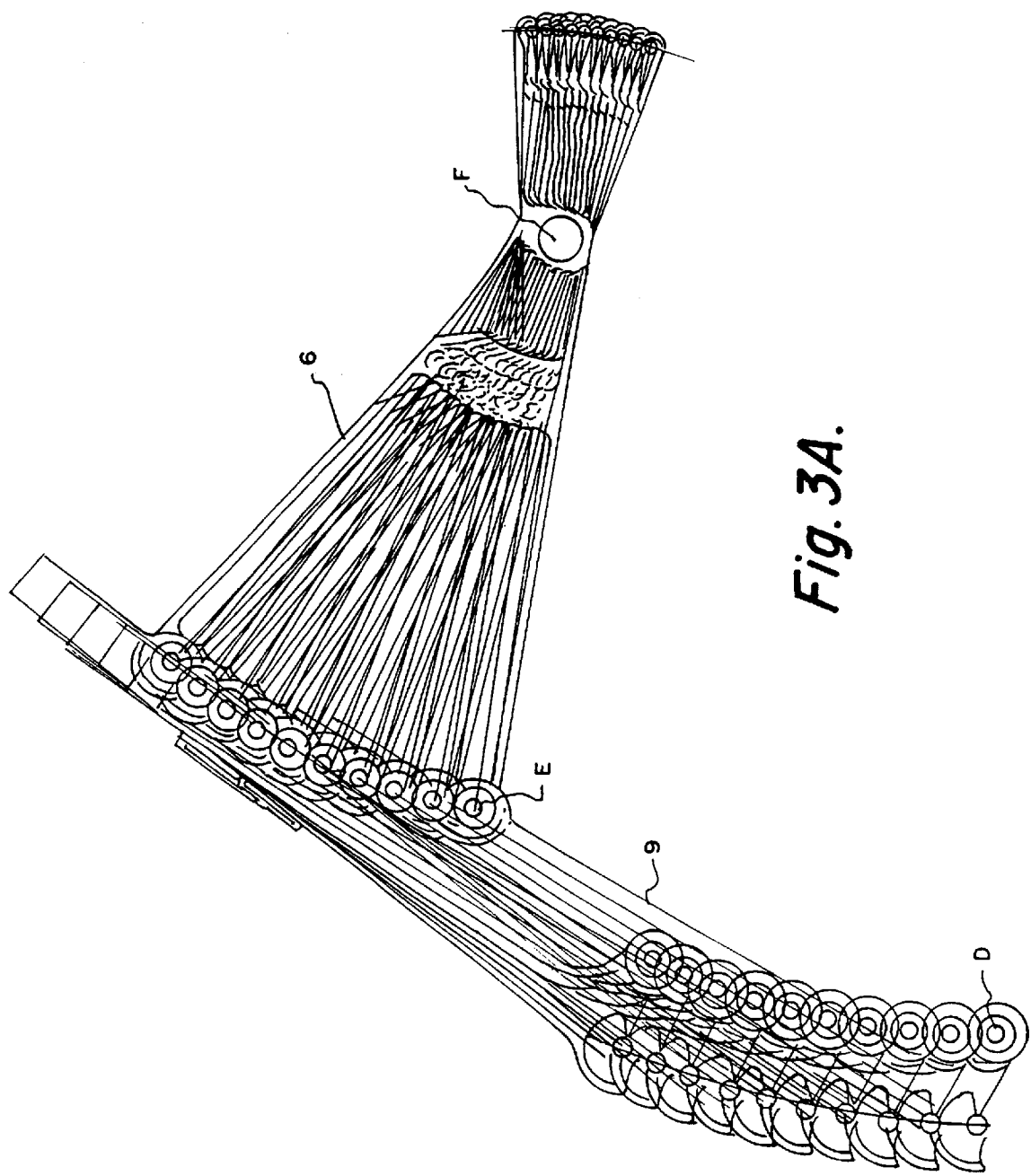
FIG. 3A is similar to FIG. 2 (it includes only the two linkage arms adjacent the dark axis lines in FIG. 2), illustrating the nearly linear shock motion ratio achievable with the instant invention.
Figure 3B:
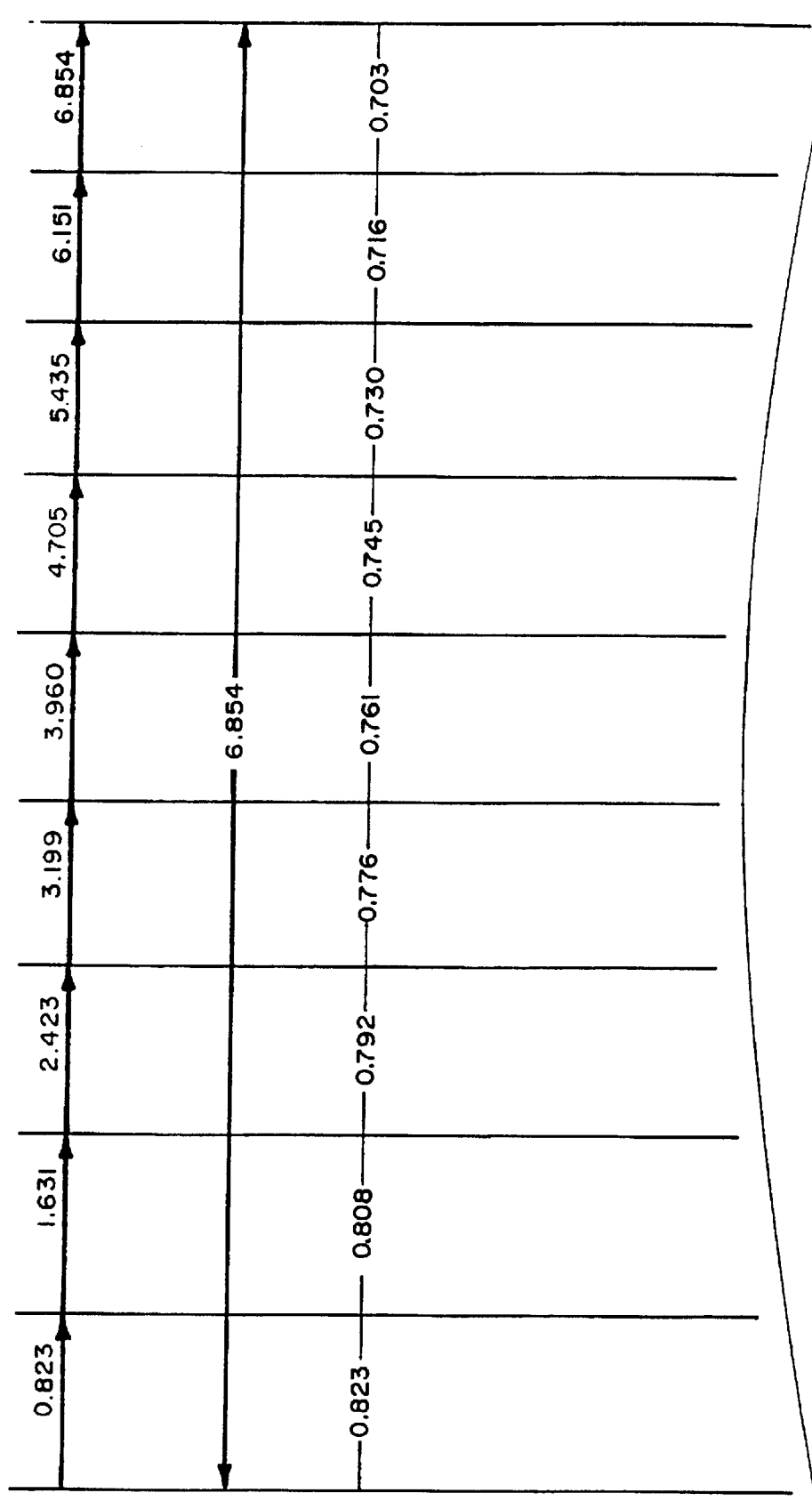
FIG. 3B is an enlarged version of the dimensional movement information shown in the lower left corner of FIG. 3A (the numbers show inches of wheel movement—0.823 for the first quarter inch of shock compression, 0.808 for the next quarter inch, etc.—as well as illustrating the provision of nearly 7 full "usable" inches of wheel movement provided by the preferred embodiment). Persons of ordinary skill in the art will understand that the benefits of the invention can be enjoyed in a wide range of "travel" for a suspension (other than just the 7" just described), that the IC tracking disclosed herein greatly expands (beyond current art) the range of wheel travel that can be provided without substantially compromising the handling and sluggishness of the bike ride, and that current shock absorber technology for bicycle embodiments of the invention provides some practical "limit" on the amount of "travel" that may be readily provided in a bike without degrading the performance, prematurely wearing out the shock, etc. As those shock absorber technologies evolve, the practical range of "wheel travel" should correspondingly expand, using the inventions disclosed herein. As discussed and illustrated herein, the preferred embodiment provides a slightly decreasing motion ratio as the rocker arm is compressed. Among other things, this means that the "ride" typically gets more stiff in proportion to the amount the wheel is compressed from its normal laden position. In other words, the further the wheel suspension is compressed (the further the wheel "travels" in compression), which can be directly related to the degree of extremeness of the terrain and/or the bike's speed over a given terrain, a slightly increased spring rate or "stiffer" ride is provided (and is generally desirable under those conditions, but it is only slightly, as the current art suspension systems offer some radically increased spring rates resulting in inhibited suspension function during extreme riding, which is not desirable)
Figure 3C:
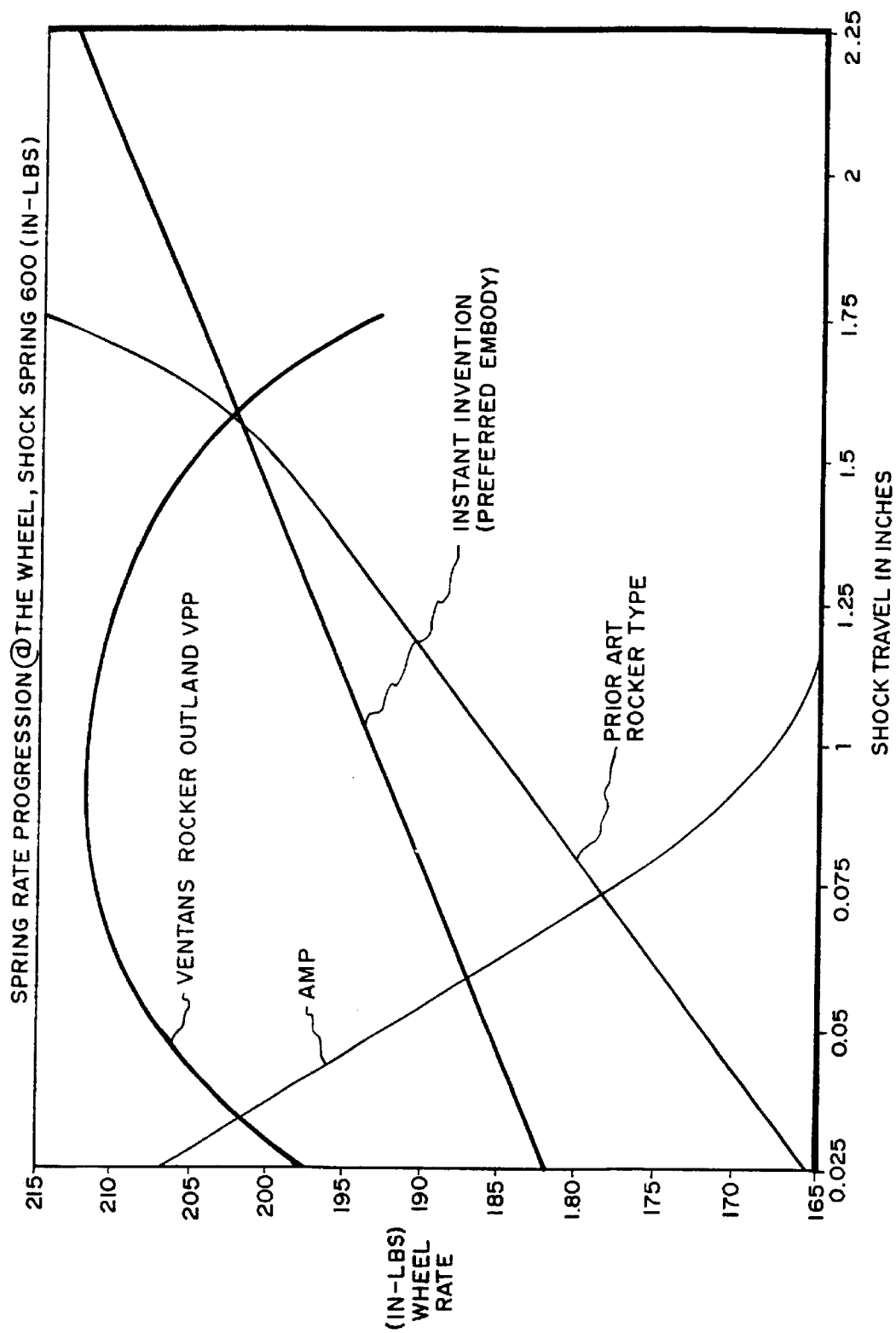
FIG. 3C is a graph based in part on the information illustrated in FIGS. 3A and 3B, illustrating the shock force performance that can be provided by using a 600 in-lb. shock spring with the preferred embodiment, and comparing that performance to other suspension designs. Persons of ordinary skill in the art will understand that the "600" is only illustrative, that it means it takes 600 lbs of force to compress the shock 1 inch, and that for mountain bikes such as illustrated in the preferred embodiment, off-the-shelf shock absorber ratings are typically in the range of 200–800 in-lbs. Although the preferred embodiment curve approaches "linear progressivity", it is slightly and gradually curved. Typically, the flatter and smoother the curve, the larger the useful range of compression distance for the shock member (the instant invention provides a much greater useful range in this regard than do prior art constructions). To desirably increase the compression resistance as the wheel becomes more compressed (in other words, to provide greater resistance to compression as larger "bumps" are encountered), the curve should slope upwards slightly from left to right, as does the curve for the instant invention.

The rear wheel suspension portion further preferably includes a shock absorber member (not shown, but indicated as positioned approximately through the area labeled "shock unit" on FIG. 1A, for example) pivotably attached at one end to a point A on an extension of the crank axle housing tube 5 (forward of the seat tube junction) and at the other end to point B near the front of the two upper rocker arms 6 and 7. The effective lengthwise axis of the shock absorber is best illustrated by imaginary line J in FIG. 1A. Persons of ordinary skill in the art will understand that although FIGS. 1–4 do not show the shock absorber that is located between mounting pivot points A and B, the shock absorber may consist of any suitable shock absorbing construction, such as a wire coil, elastomer, air or other medium spring with an oil, air or other medium damper, or any other suitable expedient.

Persons of ordinary skill in the art will understand that the shock member can be attached in a wide variety of locations and orientations in alternative embodiments of the invention. By way of example and not by way of limitation, the shock member can be attached behind the seat, connected between the shockstay and rockers, on the downtube, pulling or pushing, etc. as shown in the exemplary alternative embodiments of FIGS. 15–21.

The rear wheel suspension portion further preferably includes a lower yoke 8 which is pivotably attached at a point C near the top of the crank axle housing 5, and includes a rear wheel attachment upright assembly 9 which retains the rear wheel 30 (rotatably mounted on a wheel axis K). The preferred rear wheel attachment upright assembly 9 is pivotably attached to the rearward end of the lower yoke 8 (at the axis/point D, which axis is defined by a line extending perpendicularly in and out of the page at point D). The preferred rear wheel attachment upright assembly 9 also is pivotably attached to the upper rocker arms 6 and 7 at the axis E (extending perpendicularly in and out of the page at point E).

The attachment and alignment of pivot points D and E of the rear wheel attachment upright assembly 9 relative to the mounting of the brake caliper (see FIG. 1A) on that wheel is important to provide the desired brake torque isolation of the invention. All, or almost all, caliper brakes mount and function identically in the bicycle industry—they all must squeeze the rim in the same place, which creates a torque at that point which is then transferred into the frame at the connection points of the member on which they are mounted (for example, the shockstay 9) to the lower and/or upper swingarms (members 6, 7, and 8 in the preferred embodiment illustrated herein). As discussed elsewhere herein, if that force is aligned at a 90 degree angle, then there is no torque, and that force has no impact on the compression or extension of the suspension, etc. Any deviation from 90 degrees creates a torque moment that will pull or push the swingarms up or down—resulting in compression or extension of the suspension. As discussed elsewhere, such compression can make the suspension too stiff so that it won't properly absorb bumps, or can even cause the tire to break loose from the ground and lose traction (this is called "brake chatter"). If the moment causes the suspension to extend, that extension tends to lift the back of the bike, shifting the rider and weight forward and tending to "catapult" them over the handlebar and off the bike. None of these effects is conducive to good control of the bike.

The invention's preferred nearly-perpendicular orientation of the mounting of the brake caliper to the line drawn between the rear lower link pivot D and the rear rocker pivot E helps prevent the suspension from responding to the torque of an applied brake mounted on the rear upright or shockstay 9.

Persons of ordinary skill in the art will also understand that many of the invention's aspects in the preferred embodiment are (as in any design) the result of accommodating a wide variety of factors. Examples of such factors include providing the perpendicularity of a fully compressed shock member as described elsewhere herein, while providing for a low standover height on the frame for smaller riders. Additionally, persons of ordinary skill in the art will understand that 17.5 inches is within a current industry range for swingarm length, and although the invention can be practiced with swingarms of greater or lesser length, the handling and other considerations described herein make it preferable to try to accomplish the foregoing within a sub-17.5" swingarm length. If that dimension were too short, the rear wheel interferes with the drive train components. If it is too long, the driven tire won't maintain traction while climbing because, among other things, the rider's center of gravity is not sufficiently located over the rear tire. Too long also adversely affects handling; among other things, the bike would have a wider turning radius and thus take a greater distance to turn.

The relative dimensions, shapes, and attachment points of the rear suspension linkage components are among the factors that determine the angle of the upper rocker arms 6 and 7 with respect to the lower yoke 8. Persons of ordinary skill in the art will understand that the dimensions (illustrated in inches) and the angles (illustrated in degrees) shown in the Figures are merely illustrative, as mentioned elsewhere herein. A wide variety of suspensions can utilize aspects of the invention, even without incorporating the specific dimensions and angles shown in the Figures.

The lower yoke 8 and the upper rocker arms 6 and 7 pivotably attach to the forward frame assembly at pivot points C and F, respectively, and pivotably attach to the rear wheel attachment upright 9 at the pivot points D and E, respectively.

As best shown in FIGS. 4A–C, 5A–C, and 6, imaginary lines (respectively drawn (1) along the lengthwise axis of upper rocker arms 6 and 7 and (2) along the lengthwise axis of the lower yoke 8) converge on an imaginary forward point in space. As described herein, that point is called an "instant center", labeled "IC" in the drawings. As the rider load and shock loads vary during the ride, the rear suspension's upper rocker arms 6 and 7 and lower yoke 8 (and consequently the rear wheel 30) pivot radially about this "instant center". For any given embodiment of the invention, the precise position of the instant center at any given moment in time depends on a number of factors, including (by way of example) the location of the linkage's pivot points C, D, E, and F, the length of the rocker arms and lower yoke, and the amount of compression of the shock absorber.

The rocker and yoke pivots C, D, E, and F are preferably positioned so that the "instant center" very closely approaches or (in the best condition [such as in the laden condition of the preferred embodiment]) coincides with the driving axis of the drive chain (shown as various lines in FIGS. 4A–C and 5A–C), through a broad range of common loading conditions from the force applied to the pedals. Arrows and dimensions in FIGS. 4A–C and 5A–C illustrate the perpendicular "moment arm" for each of the situations, and where the drive chain torque line exactly coincides with the IC, there is no moment arm and therefore no chain drive torque to "suck" the rider's energy. This is illustrated, for example, in the laden condition of the preferred embodiment, in FIGS. 4C and 5B, both showing that condition for the average gear selection chain torque line. This "no-torque" condition is also illustrated in FIGS. 4A and 4B, whereby at any point of compression travel for the suspension, a gear between the maximum and minimum gear should be selectable to either "hit" the IC or get very near to it (in both FIGS. 4A and 4B, a gear between the "average" and the "minimum" force would approach or "hit" the IC; by selecting and designing the suspension using the invention disclosed herein, another embodiment of the invention can be structured in which compressed conditions would instead "hit" the IC by selecting a gear between the average and the MAXIMUM gear chain torque lines; indeed, the invention permits the IC tracking and related performance parameters to be controlled very precisely). In such situations, all of that energy that would have been "sucked" into torque can instead be channeled into force moving the bicycle and rider forward (up or down the mountain, for example).

Even when the drive chain axis does not precisely intersect the IC (and there is therefore some torque-induced loading), that loading is greatly reduced when compared to current art suspension devices and constructions. Said another way, because of the close proximity to the chain torque line of all gear combinations, if the torque were to effect the linkage, it would have a shorter distance to move the suspension apparatus in order to align the IC with the CT, thus eliminating any power loss.

Also, in the maximum compression position(see FIG. 1, for example), the perpendicular relationship between the shock absorber axis and the rocker nose provides a desirable linearly progressive shock suspension ratio (see FIGS. 2D–F and FIGS. 3A–C), while still isolating pedal and brake forces (eliminating energy-absorbing torque loads). Persons of ordinary skill in the art will understand that the "nose" of the invention can be of a variety of shapes, dimensions, and configurations, and that the particular selection of the nose design will (among other things) "program" the shock motion ratio behavior of the frame.

The precise range of movement of the instant center in this regard can be selected by varying locations of pivot points C, D, E, and F (by, for example, varying the relative size and shape of the components of the linkage), but the best embodiments of the invention keeps the instant center as close as possible to the chain drive torque line during the greatest range of loading conditions, while maintaining correct geometry for BTI and anti-squat and keeping the packaging (design) conducive to using industry standard components, adaptability to a broad range of frame sizes, and a structurally light yet sound complete frame assembly.

Thus, when the drive chain axis intersects the IC, no drive chain-induced torque moment can affect, by compression or extension, the suspension's shock absorber. Also, and as best illustrated in FIG. 1, the shock absorber (not shown) preferably has an effective lengthwise axis that is perpendicular to the axis of the rocker nose 12 during full compression of the shock absorber, helping to provide the beneficial motion ratio (described and disclosed herein as preferably being a linearly progressive ratio). Persons of ordinary skill in the art will understand that the concept of a motion ratio at all, let alone the particular shown within the preferred embodiment, is not necessary to practice and benefit from some of the other aspects of the invention.

This arrangement minimizes suspension-induced pedaling power losses caused by the drive chain moment-induced suspension movement. This loss is a primary loss of power transference efficiency in a bicycle with rear suspension.

The torque interaction between the pedaling-induced wheel driving force and the ground can also cause rider-energy-wasting suspension compression due to a torque moment transferred to the shock absorbing means via the suspension upper rocker arms and lower yoke. To counteract this moment, the suspension has approximately 10–20 percent anti-shock-absorbing means compression (or "anti-squat") built into the suspension geometry. As illustrated in FIG. 6, this percentage may be calculated by drawing an imaginary line through the center of the rear wheel tire contact patch and the "instant center". Another imaginary line is drawn through the bicycle and rider unit combination's center of gravity, perpendicularly to the ground plane. The point where this line intersects the imaginary line from the rear wheel tire's contact patch to the instant center is called the "anti-squat calculation point". The height distance in units of measure of the "anti-squat" calculation point to the ground is divided by the height distance in units of measure from the ground to the bicycle and rider unit combination's center of gravity. This number gives the percentage of "squat resistance" built into the rear suspension's geometry, where 100 percent equals full cancellation and zero percent is no cancellation.

The percentage of "anti-squat" resistance varies due to the dynamic changes of rider positioning during riding, anatomical differences among riders and the amount of static "sag" or "droop" to which the individual rider prefers to adjust his suspension. Amounts of anti-squat higher than 30 percent cause suspension bind or resistance to bump movement during pedaling, which is normally to be avoided if possible. Excessive "anti-squat" resistance built into the rear suspension's geometry can also produce unwanted suspension lifting moments during braking which reduces the rear suspension's ability to absorb bump movements. To prevent unwanted suspension movement, bind or preload under the forces of braking, the rear brake device (consisting of either a disc brake caliper or conventional bicycle rim brake) mounting point is attached to the rear wheel attachment upright. The angle of the rear wheel attachment upright to the upper rocker arms statically approaches 90 degrees in angle in a loaded condition, causing the torque moment induced by brake forces to be transferred into the forward frame assembly laterally with minimal horizontal torque component. This transfer of the brake forces thus will not have an extending effect or compressing effect on the shock absorber, leaving the suspension free to move horizontally when activated by wheel bump forces while the rear brakes are in operation. Positioning the rear suspension's instant center relatively close to the ground plane also helps the rear suspension's bump compliance under braking.

Among other things, there are two forces that affect the brake torque action discussed herein. The primary brake torque force is that of the transference of force via the shockstay member of the linkage. The secondary force is the wheel torque against the linkage, which applies to the anti-squat effect from the brake force (not the drive chain forces), which then relates to the IC in a manner similar to the way the drive torque affects the wheel torque. These primary and secondary forces are similar to the drive torque problems discussed and addressed herein (the primary drive torque "problem" force being the chain torque force, and the secondary being the wheel torque).

As compared to the "torque reactive" suspensions described above, the non-torque-reactive suspension or ICTT (Instant Center Tracking Technology) aligns the suspension's instant center with the drive chain line of the average of the gear ratios, providing greatly improved performance. As indicated above, the instant center is described as the point in space where imaginary straight lines drawn through the suspension's main pivot points intersect. This point is the imaginary or virtual axis that the rear suspension pivots about. By having the instant center aligned with the chain line on the drive or tensioned side, the cranks pulling on the chain during pedaling has no off center leverage or moment arm to lift or compress the suspension. Due to the instant center's positioning in relationship with the bicycle/rider centroid of mass distribution, the rear suspension resists wheel-induced drive torque moments that can also move the suspension. This is called "anti-squat" geometry, as discussed above. The suspension has between 10–30% "anti-squat" (depending on the position of and individual physical characteristics of the rider), allowing free, fully active suspension movement under bump conditions but providing enough resistance to reduce wheel-to-ground torque reaction induced suspension movement. Consequently, the suspension is fully active -even under the hardest of pedaling loads, allowing the tires to maintain traction on the roughest, steepest climbs. By having shock rocker arms of a length nearly equal to that of the lower yoke, the instant center follows the chain line closely throughout the suspension's entire stroke. Because the shock rockers and lower yoke are close to the same effective length, and due to the location of the pivots (C, D, E, and F), the wheel follows a nearly straight up and down path, keeping the wheel base close to constant, eliminating pedal kickback while hitting bumps while pedaling and reducing chain whip for more positive shifting. Due to the near vertical wheel path, the shock absorbing action is also more efficient as the wheel is displaced only upward (not forward) when encountering a bump.

As described above, the "instant center" is preferably located exactly on the average chain torque axis in the suspension's laden condition (as indicated elsewhere herein, "laden" condition is the normal operating position of the suspension linkage as set up by the individual rider). Chain-induced torque reaction is eliminated any time the suspension's instant center is aligned with the drive-chain line. Also, the wheel drive torque reaction between the tire and the ground is similarly reduced and controlled through anti-squat geometry as described above. The preferred embodiment results in the desired alignment of the instant center being held close to the chain line in all gear positions and suspension positions (rider load, shock load, etc.). Among other things, this results from the suspension linkage arms being nearly equal in length and going through nearly identical arcs as the rear suspension goes through its stroke, as compared to the typical prior art design of short upper and longer lower linkage arms. This geometry helps keep the instant center from shifting lower in relationship to the chain line as the suspension compresses (which shifting is typical in certain prior art designs, for those prior art designs that even have an instant center at any time). The position of the brake anchor and suspension pivot points nearly eliminates braking torque reaction.

As a result, the preferred embodiment is completely or very nearly completely non-torque-reactive in a much greater range of commonly-used gears. All that remains is very slight, minimal torque reactivity in extreme, seldom-used gear combinations. Accordingly, at least some of the extreme chain drive positions shown in FIGS. 4A–C and 5A–C infrequently occur for most riders.

The preferred embodiment's instant center tracks the chain torque line very closely, always within the range of gears and very near the average, most commonly used gears of the gear range, insuring minimal torque reaction, regardless of the suspension's location in stroke. The range of gear positions where the suspension is or is almost non-pedal-torque-reactive is very large, far larger than any current production bicycle, and/or the percentage of deviation (through the entire compression stroke, laden to fully compressed, etc.) from complete torque cancellation is smaller than that of any current production bicycle.

The invention's ability for the chain torque line to track the instant center is illustrated in the graphs and data of FIGS. 22A, 22B, 23A, and 23B. In FIGS. 22 A and B, the difference between the instant center (IC) and the chain torque line (CT) is plotted as a function of the percentage of compression of the suspension system. When the instant center tracks the chain torque line perfectly, the difference between the instant center and chain torque line is equal to zero. As is evident in FIGS. 22 A and B, the instant center of the preferred embodiment of the invention (such as the Truth 2000 model) tracks the chain line perfectly when the suspension is approximately twenty to thirty-five percent compressed (i.e. the difference between the instant center and the chain line is zero when the suspension is approximately twenty to thirty-five percent compressed, or when it is in its normally laden position). Furthermore, the maximum deviation of the instant center from the chain torque line is the lowest for the preferred embodiment of the invention, indicating that the suspension system of the current application "tracks" the chain torque line more accurately than any other suspension system of which the applicants are aware. In fact, the difference between the instant center and the chain torque line for the preferred embodiment of the invention is less than 0.66 inches in the "uncompressed" state and is less than 1.46 inches in the "fully compressed " state. Accordingly, the invention permits a tracking between the instant center and the chain torque line of less than 1.46 inches throughout the suspension's entire compression range. Persons of ordinary skill in the art will understand that these numbers are related to the amount of travel or movement of the suspension apparatus, such that all current art is 6" or less travel compared with one embodiment of the invention 7" of travel. The Truth 2000 with 5" of travel is nearer to zero then any current art. In addition, persons of ordinary skill in the art will understand that fine-tuning adjustments of any particular bicycle may slightly affect the specific numbers shown in FIGS. 22A and 22B and 23A and 23B, but that the inventive principles and concepts discussed herein still apply.

Figures 22A, 22B:
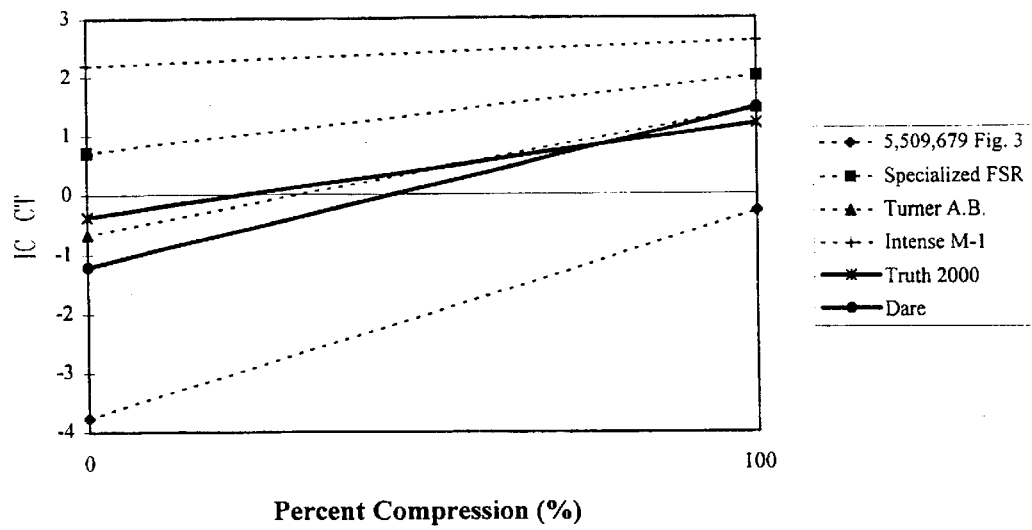
FIGS. 22A and B illustrate a graph and a related table of data depicting the relationship of various features of the preferred embodiment of the invention in relation to features of other bike suspension systems of which the inventors are aware. The top graph illustrates the relationship of the difference between the instant center (IC) and the chain torque line (CT) versus the percentage compression of the suspension system.

Although FIGS. 22A and 22B indicate that the Turner A. B. bicycle yields a similar maximum value of 1.46 (for the difference between the instant center and the chain torque), as of this date, it is unclear whether that Turner A. B. bicycle actually constitutes prior art with respect to Applicants' invention. In any case, the Turner A. B. bicycle does not teach or disclose how to achieve a maximum value lower than 1.46.

As can also be appreciated from FIGS. 22A and 22B, the majority of the bikes of which the inventors are aware never perfectly align the instant center with the chain torque line. This is fully appreciated by most of the bikes yielding values that remain above or below the zero axis throughout their entire compression ranges. When the value of the IC-CT is negative on the graph, the energy of the rider is wasted, as the resulting forces push the rider's weight up rather than forward with each pedal stroke. When the value of the IC-CT is positive, the forces tend to feed the chain torque into the shock absorber dissipating energy, that would have propelled the bike/rider unit forward, into heat.

Figures 23A, 23B:
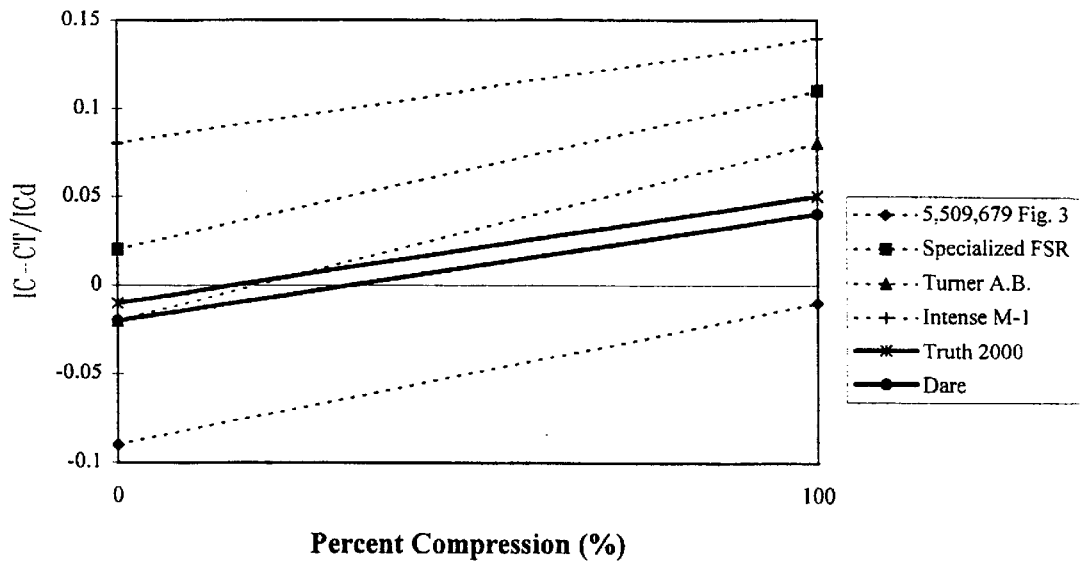
FIGS. 23A and B illustrate a graph and a related table of data depicting the relationship of the ratio of the difference between the instant center (IC) and the chain torque line (CT), and the distance from the midpoint of a line between the upper and lower two rearward pivots to the instant center (ICd) versus the percent compression of the suspension system.

FIGS. 23A and 23B illustrates the relationship of the ratio of the difference between the instant center (IC) and the chain torque line (CT), and the distance from the midpoint of a line between the upper and lower two rearward pivots to the instant center (ICd) versus the percent compression of the suspension system. As can be appreciated, the preferred embodiment of the invention (e.g. the Dare model) keeps the aforementioned ratio closer to zero than any other bicycle throughout the entire compression. In particular, the aforementioned ratio is less than 0.08 throughout the entire compression range of the preferred embodiment of the invention. This results in the maintenance of consistent anti-squat programming in the linkage system, as discussed above.

Suspension action of the preferred embodiment of the invention is unaffected by pedal force input. The suspension of the invention is almost completely non-brake-torque reactive under most suspension load conditions. The mildly progressive, near-linear shock motion ratio provided by the invention works well with a wide range of shock absorbing elements, such as coil spring and air spring type shock absorbers. The invention's near-constant wheelbase dimension insures positive shifting and eliminates suspension-induced pedal kickback. The near-vertical wheel path (during shock absorption) insures efficient shock absorption and reduces forward drive energy losses. The invention is a simple, elegant, rigid design.

Although bicycles incorporating the invention are more expensive to manufacture than those having a non-suspended design, it will typically be less than a lot of current art suspended designs (because the design is less complex and requires less materials, etc.), and the cost will be worth the improved performance for many, if not most, riders.

A method of shock absorption includes the steps of providing a four-piece linkage as described herein, which linkage is pivotal at four points of connection forming the linkage, and providing a shock absorber member mounted between two opposing members of that linkage, and imposing loads on the shock absorber. Further steps include providing a linkage of the aforementioned character in a bicycle construction, riding the bicycle, and traveling over rugged terrain. Those two opposing members (such as the lower swingarm or yoke 8 and upper swingarms or rocker arms 6, 7, respectively) each have first and second ends and a middle portion therebetween. The shock absorber member is preferably located relatively toward the first end, which first end is illustrated in the drawings as being toward the front end of the bicycle. In alternative embodiments the yoke 8 and rocker arms 6, 7 might be positioned so that the rear wheel attachment upright assembly 9 is pivotably attached to the middle portion of those components, and the shock absorber is rearward of the rear wheel attachment upright assembly 9 (to some degree, the shock member can be mounted anywhere, although the packaging really suffers with some choices of shock location), and in any case the shock absorber is preferably mounted in a spaced relationship from the other two linkage members.

Figure 5A:
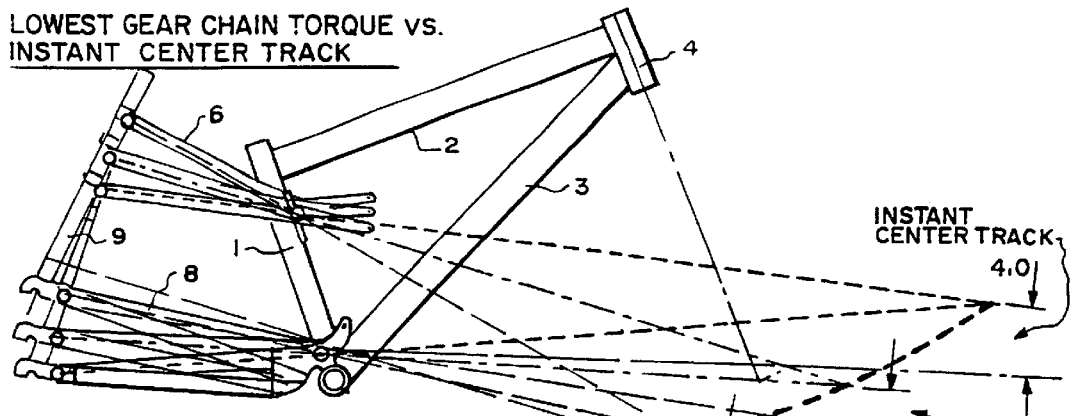
FIGS. 5A–C are similar to FIGS. 4A–C, but instead each shows a single gear chain torque line (lowest gear, average gear, and highest gear) and illustrates how the instant center moves with respect to each of those lines during compression of the suspension from a laden, to a midpoint, to a fully compressed state. As with FIGS. 4A–C, note that several of the illustrated compression/chain torque combinations are unlikely to ever occur during use of the bike.
Figure 5B:
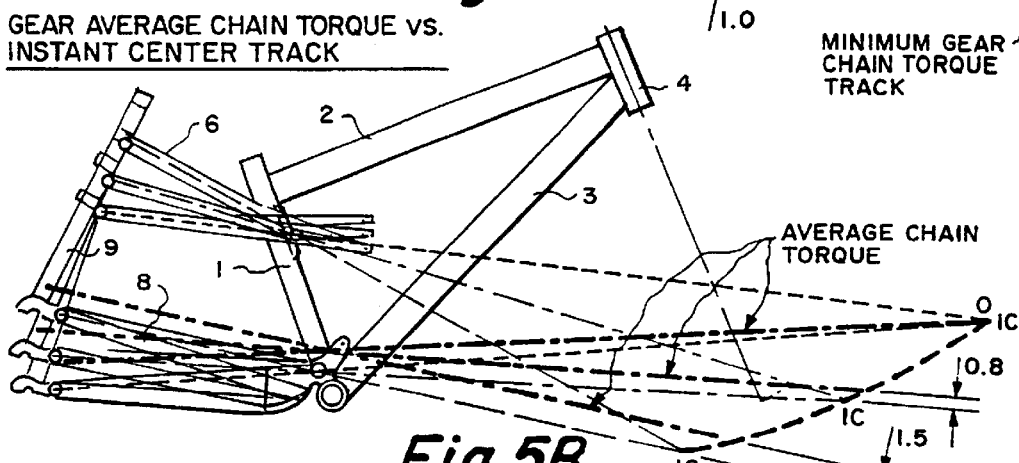
Figure 5C:
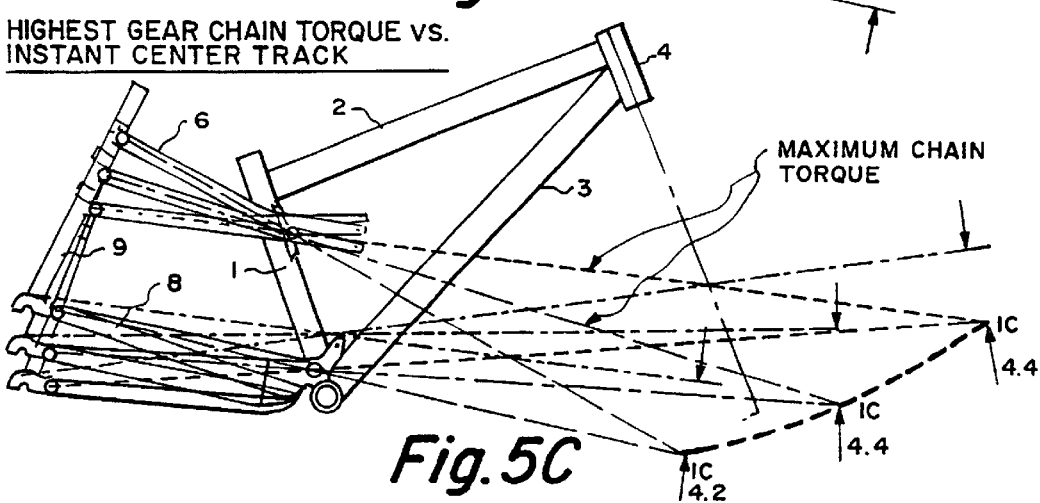

When developing the preferred instant center location, at least the following factors indicate that the IC should generally not be too close to the bottom bracket along the average chain line torque vector (the closer the IC, the more extreme the noted problems become):

1. The closer the IC location, the shorter the upper link (or bellcrank) (corresponding to members 6, 7 in the preferred embodiment). The shorter the bellcrank, the more quickly and further the IC "dives" below the chain line as the suspension is compressed. This "diving" undesirably contributes to the aforementioned jacking effect under pedal torque load, due to the torque moment created by the distance between the IC and the chain line. In contrast to any such "close" prior art approaches, the IC of the instant invention tends to better "track" the chain line under compression and not depart as far from that line. For example, and as shown in FIG. 5B, the IC of the preferred embodiment only very gradually moves away from the average chain torque line as the suspension becomes more compressed. Moreover, as shown in FIGS. 5A and 5C, the preferred embodiment's IC actually moves closer to the chain drive lines during the compression stroke, if the rider has selected the maximum or minimum gear arrangement. The suspension's particular performance characteristics in this regard can be selected by the frame designer, by using the inventive method and apparatus set forth herein. Although at first blush, certain prior art suspensions appear to provide (at least in certain stages of shock compression) a torque arm (and consequent torque force) for the chain torque line that is less than the instant invention, that "torque" sensation and force experienced by the rider actually involves an additional "moment arm": the distance between the IC (functioning as a virtual pivoting axis) and the "mass" being pivoted around that axis (the wheel, the suspension, etc.). In other words, the "torque" experienced by the rider (and the energy "wasted" or "sucked" away) is a function of both the aforementioned "mass" acting on its moment arm (the distance from that mass center to the IC) and the chain drive force acting on its moment arm. Thus, when the IC is moved "close" to the rear wheel, for example, the "mass" is easier to move (because its moment arm is shorter), and therefore the jacking, etc. caused by a given amount of misalignment of the IC from the chain torque line is greater than if the IC were farther forward. Said another way, the effective energy "suck" or wheel movement would occur for an IC closer to the rear wheel but having a proportionally shorter distance between the IC and the chain force line as for an IC "farther" out but having a proportionally longer distance between the IC and the chain force line.

2. An IC located in a "close" position would require a relatively shorter upper link and would require a relatively shorter shock absorber. Consequently, such "closer" IC designs have a very high motion ration with a rapid change in rate (rising, falling) in any embodiment where the design packaging would be practical. Moreover, rapid changes in shock absorber piston velocity are difficult for the shock's valving to handle accurately, and unduly wear out the shock member.

3. A "close-in" IC necessitates locating the main load-bearing pivots (those that would correspond with C and F in FIG. 1, for example) more closely together along the seat tube 1. These pivots sustain extreme torsion loads during cornering and very hard pedaling. If the pivots are located too closely together, the seat tube 1 will be put in unsupported torsion. The main pivots C and F in the instant invention are preferably sufficiently spread from each other (and/or are correspondingly close to the top and down tubes 2 and 3) so as not to couple the seat tube 1 in torsion and to instead apply those loads directly to the tubes that will better absorb them.

4. The closer the IC, the more difficult it is to provide an upright (such as upright 9) with an operating range at or near the optimal 90 degree angle to the upper rocker for brake torque reaction isolation.

5. The closer the IC the higher the percentage of anti-squat that can add to the unwelcome jacking of the rear suspension under braking and suspension function reducing bind of the suspension under pedaling loads.

Similarly, when developing the preferred instant center location, at least the following factor indicates that the IC should generally not be too far from the bottom bracket along the average chain line torque vector (the closer the IC, the more extreme the noted problems become):

1. The farther the IC is from the bottom bracket, the more the suspension will act like a prior art parallel link suspension and thus be subjected to unequal chain torque loads (where the chain location is typically closer to one pivot axes [generally the lower swingarm in current bicycle art] causing more torque loading on that axis, which can result in "lock out" or upward "jacking" on the linkage) and will be unable to provide any desired anti-squat geometry, or the percentage of anti-squat becomes so small as to be meaningless. Although this would be preferable to having the IC set too closely in, the maximum "far" position for the IC is generally determined by packaging considerations, along with balancing all other design and performance elements (such as BTI and Anti-squat). As indicated above, "too close" is generally worse then "too far".

In contrast to the aforementioned prior art problems with "brake induced torque", the ICTT rear suspension does not have a traditional forward sloping seat stay tube; the preferred ICTT has a wheel retaining "upright" 9 instead. An angle of close to 90 degrees under load is maintained from the rear upright to the upper rocker arm greatly reducing the amount of torque transferred to the rear suspension. Due to the location of the instant center, wheel braking forces are transmitted to near the bicycle's drive chain axis which, since it is fairly close to the plane of the ground, cannot contribute to any significant jacking or squatting effect.

Unlike the above-described shock absorber motion ratio problems that exist in current designs, the ICTT rear suspension uses long rocker arms to maintain as close to linear shock motion ratio as possible. The invention's rocker geometry has a gentle rising rate that is accommodating to bumps of all sizes and frequencies. The invention's gentle rising rate works well with both coil spring and air spring type shocks. With small shock rockers having a rapid change of shock rate, the shock absorber's valving (which affect the shock absorber performance in compression and rebound) is subjected to very rapid shaft speed accelerations. The longer shock rockers 6, 7 of the instant invention lowers the typical shock shaft velocity, improving the shock's damping performance. At very high motion ratios, damping changes must happen with very small shock shaft movements. The ICTT suspension's gentle rising rate allows greater shock valve sensitivity due to the more constant shock shaft speed throughout the suspension's stroke.

Unlike the complicated designs of current bicycle suspensions, the ICTT rear suspension accomplishes all of its goals in a simple, stiff, rugged, lightweight package with a minimum of parts, flex-inducing pivots and excess complexity.

The apparatus and methods of our invention have been described with some particularity, but the specific designs, constructions and steps disclosed are not to be taken as delimiting of the invention in that various obvious modifications will make themselves apparent to those of ordinary skill in the art, all of which will not depart from the essence of the invention and all such changes and modifications are intended to be encompassed within the appended claims.

We claim:

1. A bicycle, including
   a suspension system comprising an upper rocker arm and a lower rocker arm, each rocker arm comprising rearward and forward pivot points, and a shockstay having a receptacle to receive a rear wheel axle, the shockstay pivotably connected to the rearward pivot point of each of the upper and lower rocker arms,
   said suspension system aligns and tracks an instant center with an average chain force torque line,
      said average chain force torque line defined as a parallel line extending along the tension side of the bicycle's chain when the chain is positioned at a vertical distance from the center of the forward and rearward chain sprockets, respectively, wherein the vertical distance is the average of the radii of the smallest and largest forward chain sprockets and the average of the radii of the smallest and largest rearward chain sprockets,
      wherein said instant center is defined as a point at the intersection of a first imaginary straight line drawn through the rearward and forward pivot points of the upper rocker arm, and a second imaginary straight line drawn through the rearward and forward pivot points of the lower rocker arm, and wherein the instant center is initially located in front of a front wheel axle, and above a horizontal line extending through the front wheel axle when the suspension system is not compressed, and a perpendicular distance between the instant center and the chain torque line decreases to zero as the suspension is compressed.

2. The bicycle of claim 1 wherein the distance between said instant center and said average chain force torque line is zero at any point throughout said suspension system's full range of compression.

3. The bicycle of claim 2 wherein the distance between said instant center and said average chain force torque line is zero when said bicycle is in a normally laden position.

4. The bicycle of claim 1 or claim 2 or claim 3 wherein a ratio of the difference between said instant center and said average chain force torque line, and a distance from a midpoint of a line between an upper and lower two rearward pivot points to said instant center, is less than approximately 0.08 throughout a full range of compression of said wheel suspension system.

5. The bicycle of claim 1 or claim 2 or claim 3 wherein the distance between said instant center and said average chain force torque line is less than 1.46 inches throughout said suspension system's full range of compression.

6. A bicycle, including
   a main frame,
   a shock absorbing rear wheel suspension comprising an upper rocker arm and a lower rocker arm, each rocker arm comprising rearward and forward pivot points, and a shockstay having a receptacle to receive a rear wheel axle, the shockstay pivotably connected to the rearward pivot points of each of the upper and lower rocker arms, and
   a chain drive operatively attached to said main frame and to a rear wheel coupled to said shock absorbing rear wheel suspension,
      in which an instant center of said rear wheel suspension tracks a chain torque line, said instant center defined as a point at the intersection of a first imaginary straight line drawn through the rearward and forward pivot points of the upper rocker arm, and a second imaginary straight lute drawn through the rearward and forward pivot points of the lower rocker arm, wherein the instant center is initially located in front of a front wheel axle, and above a horizontal line extending through the font wheel axle when the suspension system is nor compressed, and a perpendicular distance between the instant center and the chain torque line decreases to zero as the suspension is compressed, and
      the chain torque line defined as a parallel line extending along the tension side of the chain while the chain is positioned on chain sprockets of the chain dive.

7. The bicycle of claim 1 or 2 or 3, in which said shockstay comprises a rear frame member having at least one lower support and at least one upper support, wherein said lower and upper supports define an angle having a vertex near said rear wheel axis.

8. The bicycle of claim 7, further including a unified stay assembly pivotably attached to said upper and lower rocker arms, said stay assembly positioned relatively forward of said rear wheel.

9. The bicycle of claim 8, which said stay assembly has a single lower end to attach to said lower rocker arm, and a pair of upper ends to attach to said upper rocker arms.

10. The bicycle of claim 1 or 2 or 3, in which a plurality of said pivot points are substantially forward of a rear wheel axle.

11. The bicycle of claim 10, wherein more than two of said pivot points are located forward of the rear wheel.

12. A bicycle, including
   wheel suspension means for tracking a chain torque line with an instant center to reduce torque moments,
      wherein said instant center is defined as a point at the intersection of a first imaginary straight line drawn through the rearward and forward pivot points of an upper rocker arm, and a second imaginary straight line drawn through the rearward and forward pivot points of a lower rocker arm, and wherein the instant center is located in front of a font wheel axle, and above a horizontal line extending through the front wheel axle when the suspension system is not compressed, and a perpendicular distance between the instant center and the chain torque line decreases to zero as the suspension is compressed, and the chain torque line defined as a parallel line extending along the tension side of the chain while positioned on chain sprockets of a chain drive.

13. The bicycle of claim 12, wherein said wheel suspension means aligns said instant center with any chain torque line.

14. The bicycle of claim 13, wherein the distance between said instant center and the chain torque line is zero at any point throughout said wheel suspension means' range of travel.

15. A bicycle, including a suspension system comprising an upper rocker arm and a lower rocker arm, each rocker arm comprising rearward and forward pivot points, and a shockstay having, a receptacle to receive a rear wheel axle, the shockstay connected to the rearward pivot points of each of the upper and lower rocker arms, said suspension system tracks a chain force torque line with an instant center, wherein said instant center is defined as a point at the intersection of a first imaginary straight line drawn through the rearward and forward pivot points of the upper rocker arm, and a second imaginary straight line drawn through the rearward and forward pivot points of the lower rocker arm and wherein The instant center is located in front of a front wheel axle, and above a horizontal line extending through the front wheel axle when the suspension system is not compressed, and i perpendicular distance between the instant center and the chain torque line decreases to zero as the suspension is compressed, and the chain force torque line is defined as a parallel line extending along the tension side of the chain while the chain is positioned on chain sprockets of the bicycle.

16. A bicycle, including a suspension system comprising an upper rocker arm and a lower rocker arm, and a shockstay having a receptacle to receive a rear wheel axle, the shockstay connected to rearward pivot points of each of the upper and lower rocker arms, said suspension system tracks a chain force torque line with an instant center, wherein said instant center is defined as a point at the intersection of a first imaginary line extending forward from the rear end, along the center, of the upper rocker arm, and a secondary imaginary line extending forward from the rear end, along the center, of the lower rocker am and wherein the instant center is located in front of a front wheel axle, and above a horizontal line extending through the front wheel axle when the suspension system is not compressed and a perpendicular distance between the instant center and the chain torque line decreases to zero as the suspension is compressed, and the chain force torque line is defined as a parallel line extending along the tension side of the chain while the chain is positioned on chain sprockets of the bicycle.

* * * * *

UNITED STATES PATENT AND TRADEMARK OFFICE
CERTIFICATE OF CORRECTION

PATENT NO. : 6,378,885 B1
DATED : April 30, 2002
INVENTOR(S) : Ellsworth et al.

It is certified that error appears in the above-identified patent and that said Letters Patent is hereby corrected as shown below:

Title page,
Item [57], ABSTRACT,
Line 2, "lower roker arm (8)" should read -- lower rocker arm (8) --.

Column 1,
Line 4, "U.S. U.S. Provisional" should read -- U.S. Provisional --.
Line 38, "wheel suspension" should read -- wheel suspensions --.

Column 5,
Line 56, "moment is counteracts" should read -- moment counteracts --.

Column 11,
Line 61, "(FIG. 21)" should read -- (FIG. 2I) --.

Column 12,
Line 21, "(FIG. 21)" should read -- (FIG. 2I) --.
Line 43, change "one pound" to read -- two pounds --.

Column 25,
Line 36, "rearward pivot point" should read -- rearward pivot points --.

Column 26,
Line 33, "font wheel axle" should read -- front wheel axle --.
Line 50, "claim 8, which" should read -- claim 8, in which --.
Line 67, "font wheel axle" should read -- front wheel axle --

Column 27,
Line 30, "wherein The" should read -- wherein the --.

UNITED STATES PATENT AND TRADEMARK OFFICE
CERTIFICATE OF CORRECTION

PATENT NO.    : 6,378,885 B1
DATED         : April 30, 2002
INVENTOR(S)   : Ellsworth et al.

It is certified that error appears in the above-identified patent and that said Letters Patent is hereby corrected as shown below:

Column 28,
Line 1, "and i perpendicular" should read -- and a perpendicular --.
Line 21, "lower rocker am" should read -- lower rocker arm --.

Signed and Sealed this

Twenty-fourth Day of September, 2002

*Attest:*

*Attesting Officer*

JAMES E. ROGAN
*Director of the United States Patent and Trademark Office*